US012665644B2

(12) United States Patent
Sen et al.

(10) Patent No.: US 12,665,644 B2
(45) Date of Patent: Jun. 23, 2026

(54) LOS MIMO SIGNALING ASPECTS

(71) Applicant: QUALCOMM INCORPORATED, San Diego, CA (US)

(72) Inventors: Pinar Sen, San Diego, CA (US); Abdelrahman Mohamed Ahmed Mohamed Ibrahim, San Diego, CA (US); Seyong Park, San Diego, CA (US); Renqiu Wang, San Diego, CA (US); Muhammad Sayed Khairy Abdelghaffar, San Jose, CA (US); Yu Zhang, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/720,555

(22) PCT Filed: Feb. 21, 2022

(86) PCT No.: PCT/CN2022/077044
§ 371 (c)(1),
(2) Date: Jun. 14, 2024

(87) PCT Pub. No.: WO2023/155187
PCT Pub. Date: Aug. 24, 2023

(65) Prior Publication Data
US 2025/0112680 A1     Apr. 3, 2025

(51) Int. Cl.
*H04L 23/02* (2006.01)
*H04B 7/06* (2006.01)
(Continued)

(52) U.S. Cl.
CPC ......... *H04B 7/0626* (2013.01); *H04B 7/0628* (2013.01); *H04B 7/063* (2013.01); *H04L 5/0048* (2013.01); *H04W 48/16* (2013.01)

(58) Field of Classification Search
CPC .. H04B 7/0413; H04B 7/0456; H04B 7/0695; H04B 7/0626; H04B 7/0482;
(Continued)

(56) References Cited

U.S. PATENT DOCUMENTS 10,020,577 B2     7/2018 Sanderovich et al.
2010/0177664 A1*  7/2010 Thoumy ................ H04B 7/088
                                                    370/254
(Continued)

FOREIGN PATENT DOCUMENTS

CN     104980247 A     10/2015
CN     107005289 A     8/2017
(Continued)

OTHER PUBLICATIONS

International Search Report and Written Opinion—PCT/CN2022/077044—ISA/EPO—Nov. 22, 2022.
(Continued)

*Primary Examiner* — Khai Tran
(74) *Attorney, Agent, or Firm* — Holland & Hart LLP

(57) ABSTRACT

Methods, systems, and devices for line of sight (LOS) multiple input multiple output (MIMO) signaling aspects for wireless communication. A wireless device may transmit, to a network device, a capability message indicating that the wireless device supports a LOS mode. The wireless device may receive, from the network device in response to the capability message, a control message indicating activation of the LOS mode and at least one LOS mode parameter based at least in part on a channel measurement associated with a wireless channel between the wireless device and the
(Continued)

network device indicating that the wireless channel satisfies a LOS path criterion. The wireless device may communicate a message with the network device in accordance with the LOS mode parameter.

30 Claims, 20 Drawing Sheets

(51) Int. Cl.
H04L 5/00 (2006.01)
H04W 48/16 (2009.01)

(58) Field of Classification Search
CPC .... H04B 7/0417; H04W 24/08; H04W 16/28; H04L 5/0044; H04L 5/0048
USPC .................................. 375/262, 260, 267, 299
See application file for complete search history.

(56) References Cited

U.S. PATENT DOCUMENTS

| | | | | | |
|---|---|---|---|---|---|
| 2013/0272217 | A1* | 10/2013 | Negus | ............... | H04W 72/0453 |
| | | | | | 370/329 |
| 2020/0007247 | A1 | 1/2020 | Gulati et al. | | |
| 2022/0014920 | A1* | 1/2022 | Pham Van | .............. | H04W 4/20 |
| 2022/0107381 | A1* | 4/2022 | Moon | .................... | H04B 7/088 |

FOREIGN PATENT DOCUMENTS

| | | | |
|---|---|---|---|
| WO | WO-2016085577 | A1 | 6/2016 |
| WO | WO-2018102163 | A1 | 6/2018 |
| WO | WO-2021253018 | A2 | 12/2021 |

OTHER PUBLICATIONS

QUALCOMM Incorporated: "Discussion on Positioning Enhancements UE Features", R1-2112250, 3GPP TSG RAN WG1 #107-e, 3rd Generation Partnership Project, Mobile Competence Centre, 650, Route Des Lucioles, F-06921, Sophia-Antipolis Cedex, France, vol. RAN WG1, No. e-Meeting, Nov. 11, 20211-Nov. 19, 2021, Nov. 19, 2021, XP052075355, pp. 1-19, pp. 4-7.
Supplementary European Search Report—EP22926514—Search Authority—Munich—Oct. 9, 2025.

* cited by examiner 105-a 110-a 115-a

Capability Message 205
Control Message 210
Downlink Reference Signal 215
Uplink Reference Signal 220

200

300-a

Symbols

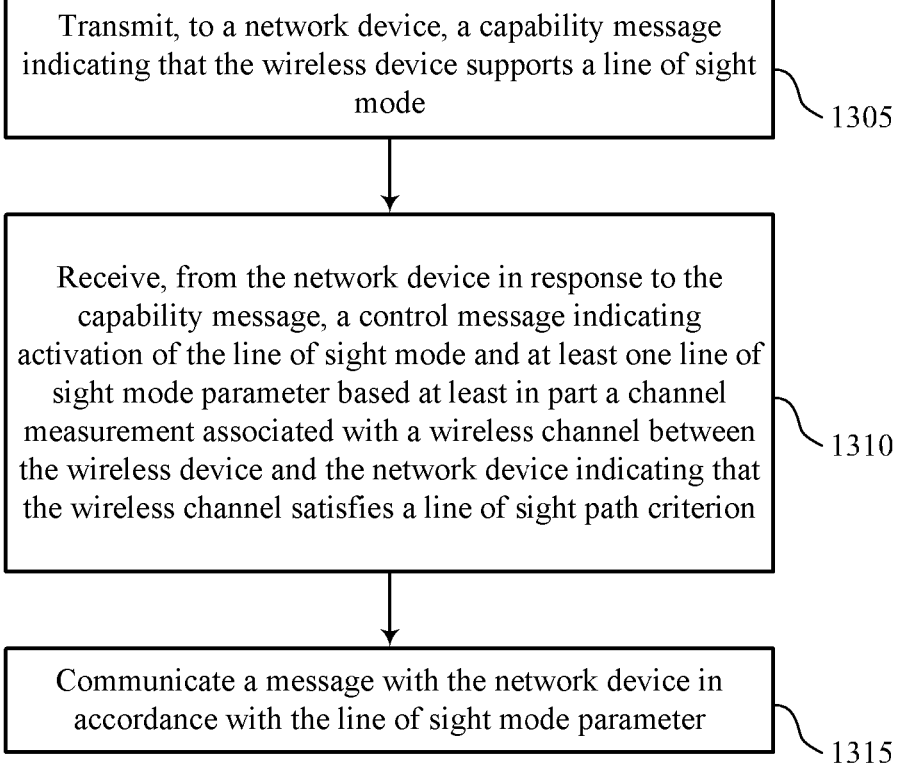

Transmit, to a network device, a capability message indicating that the wireless device supports a line of sight mode

1305

Receive, from the network device in response to the capability message, a control message indicating activation of the line of sight mode and at least one line of sight mode parameter based at least in part a channel measurement associated with a wireless channel between the wireless device and the network device indicating that the wireless channel satisfies a line of sight path criterion

1310

Communicate a message with the network device in accordance with the line of sight mode parameter

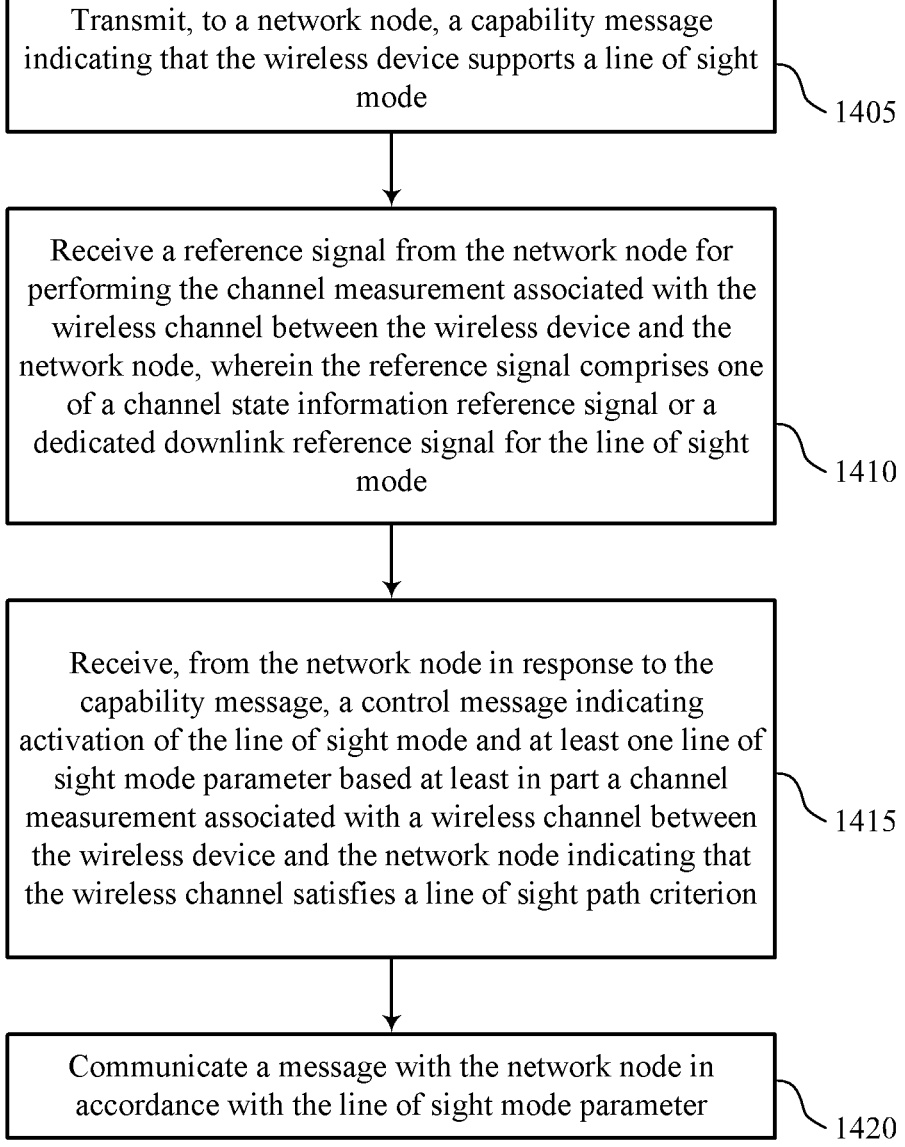

Transmit, to a network node, a capability message indicating that the wireless device supports a line of sight mode

1405

Receive a reference signal from the network node for performing the channel measurement associated with the wireless channel between the wireless device and the network node, wherein the reference signal comprises one of a channel state information reference signal or a dedicated downlink reference signal for the line of sight mode

1410

Receive, from the network node in response to the capability message, a control message indicating activation of the line of sight mode and at least one line of sight mode parameter based at least in part a channel measurement associated with a wireless channel between the wireless device and the network node indicating that the wireless channel satisfies a line of sight path criterion

1415

Communicate a message with the network node in accordance with the line of sight mode parameter

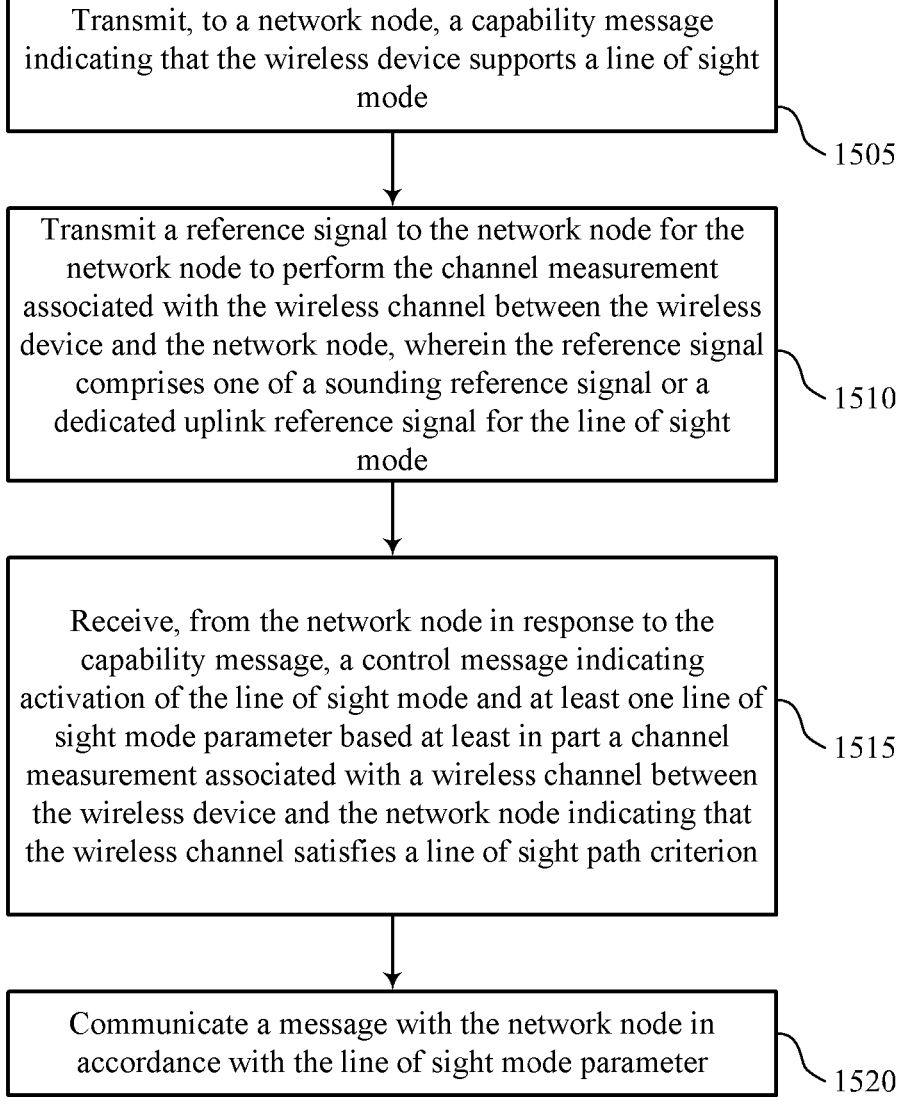

Transmit, to a network node, a capability message indicating that the wireless device supports a line of sight mode

1505

Transmit a reference signal to the network node for the network node to perform the channel measurement associated with the wireless channel between the wireless device and the network node, wherein the reference signal comprises one of a sounding reference signal or a dedicated uplink reference signal for the line of sight mode

1510

Receive, from the network node in response to the capability message, a control message indicating activation of the line of sight mode and at least one line of sight mode parameter based at least in part a channel measurement associated with a wireless channel between the wireless device and the network node indicating that the wireless channel satisfies a line of sight path criterion

1515

Communicate a message with the network node in accordance with the line of sight mode parameter

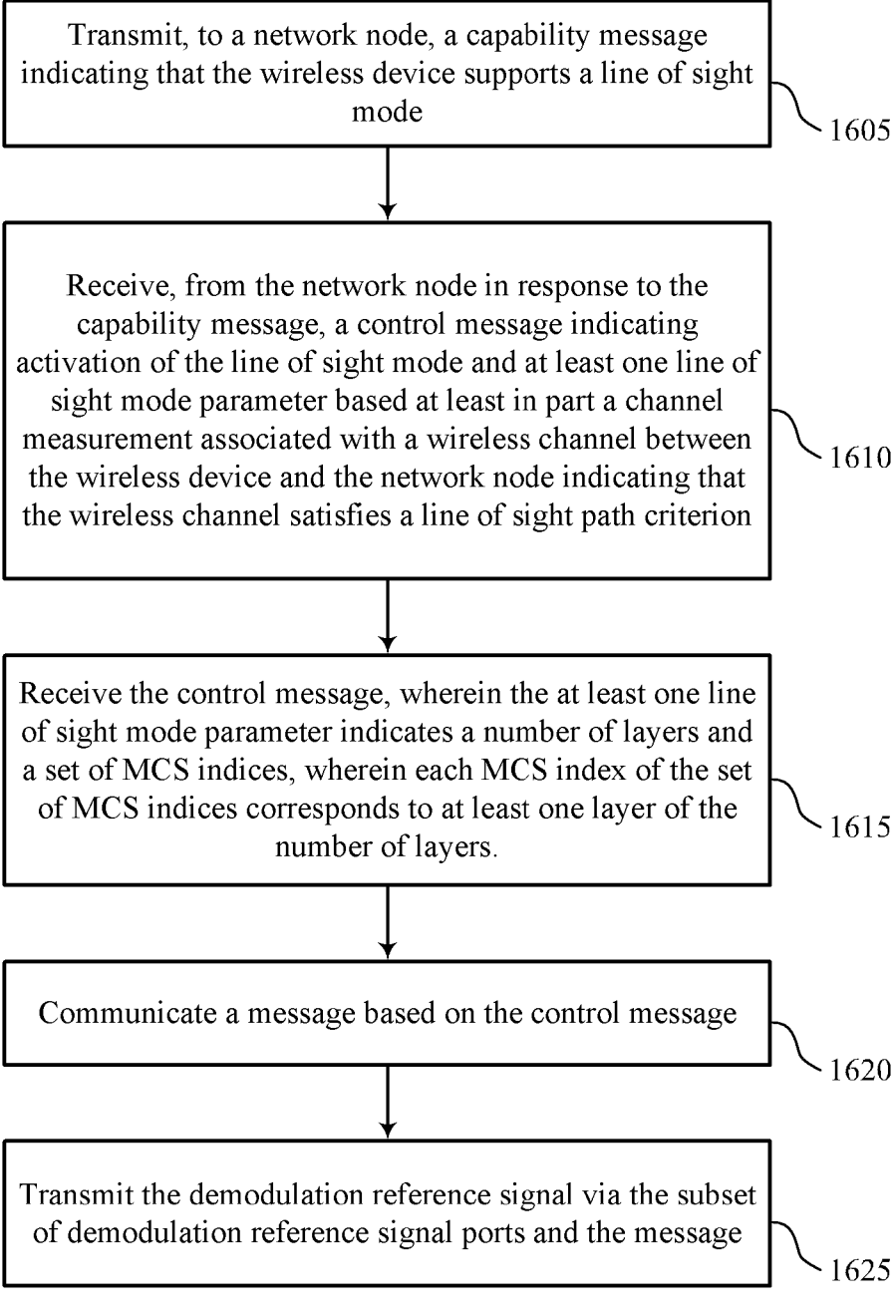

Transmit, to a network node, a capability message indicating that the wireless device supports a line of sight mode ⟍ 1605

Receive, from the network node in response to the capability message, a control message indicating activation of the line of sight mode and at least one line of sight mode parameter based at least in part a channel measurement associated with a wireless channel between the wireless device and the network node indicating that the wireless channel satisfies a line of sight path criterion ⟍ 1610

Receive the control message, wherein the at least one line of sight mode parameter indicates a number of layers and a set of MCS indices, wherein each MCS index of the set of MCS indices corresponds to at least one layer of the number of layers. ⟍ 1615

Communicate a message based on the control message ⟍ 1620

Transmit the demodulation reference signal via the subset of demodulation reference signal ports and the message ⟍ 1625

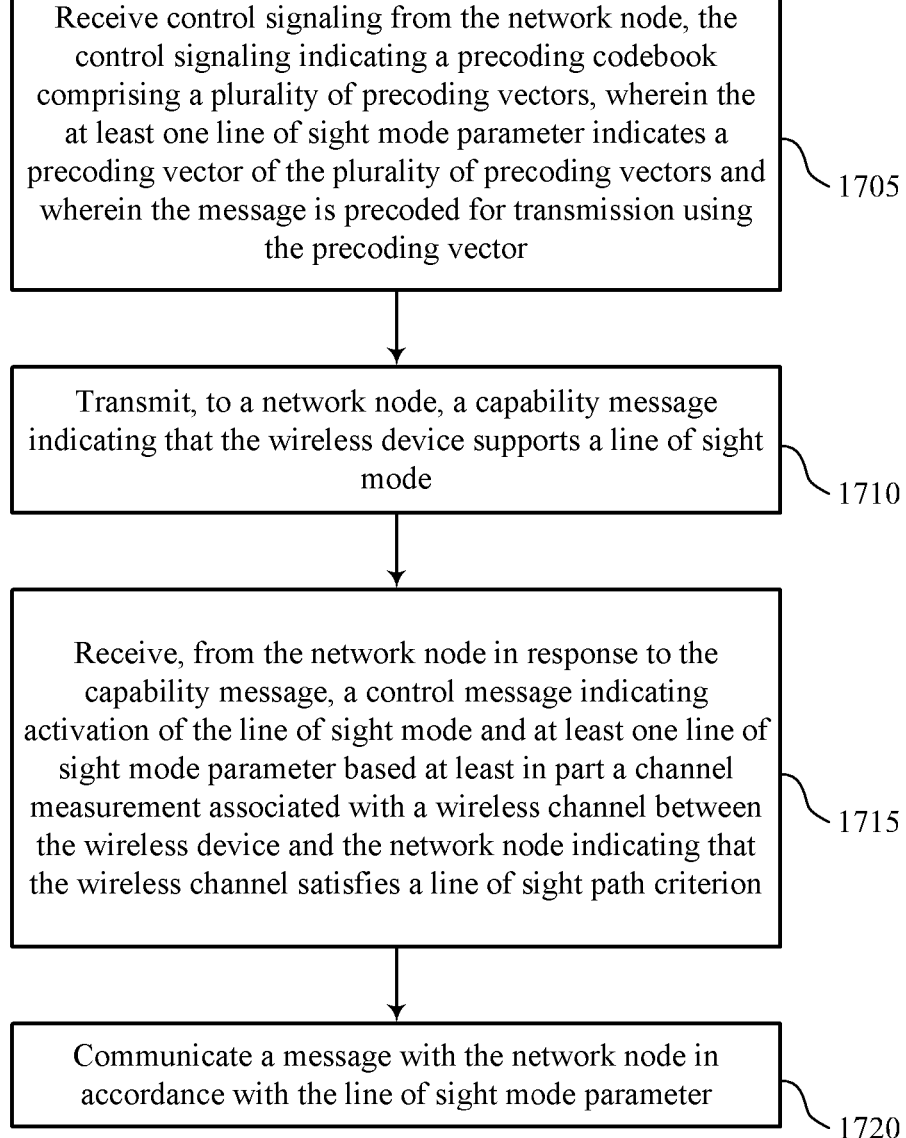

Receive control signaling from the network node, the
control signaling indicating a precoding codebook
comprising a plurality of precoding vectors, wherein the
at least one line of sight mode parameter indicates a
precoding vector of the plurality of precoding vectors and
wherein the message is precoded for transmission using
the precoding vector

1705

Transmit, to a network node, a capability message
indicating that the wireless device supports a line of sight
mode

1710

Receive, from the network node in response to the
capability message, a control message indicating
activation of the line of sight mode and at least one line of
sight mode parameter based at least in part a channel
measurement associated with a wireless channel between
the wireless device and the network node indicating that
the wireless channel satisfies a line of sight path criterion

1715

Communicate a message with the network node in
accordance with the line of sight mode parameter

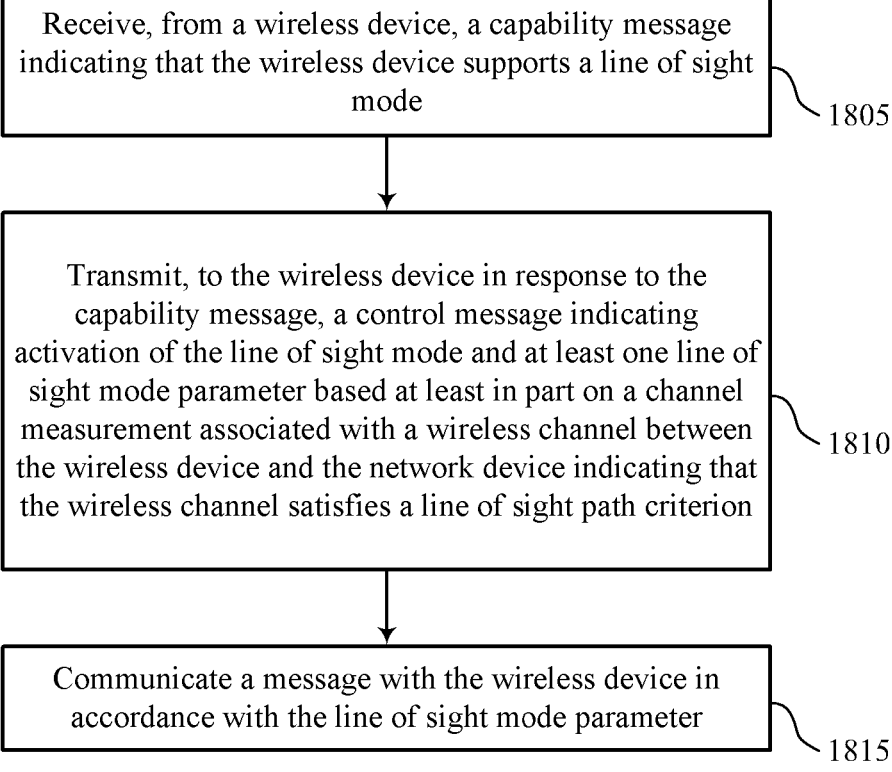

Receive, from a wireless device, a capability message indicating that the wireless device supports a line of sight mode — 1805

Transmit, to the wireless device in response to the capability message, a control message indicating activation of the line of sight mode and at least one line of sight mode parameter based at least in part on a channel measurement associated with a wireless channel between the wireless device and the network device indicating that the wireless channel satisfies a line of sight path criterion — 1810

Communicate a message with the wireless device in accordance with the line of sight mode parameter — 1815

LOS MIMO SIGNALING ASPECTS

CROSS REFERENCE

The present Application is a 371 national stage filing of International PCT Application No. PCT/CN2022/077044 by Sen et al. entitled "LOS MIMO SIGNALING ASPECTS," filed Feb. 21, 2022, which is assigned to the assignee hereof, and which is expressly incorporated by reference in its entirety herein.

FIELD OF TECHNOLOGY

The following relates to wireless communications, including LOS MIMO signaling aspects.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support line of sight (LOS) multiple input multiple output (MIMO). In some examples, LOS MIMO may provide high multiplexing gain with the satisfaction of one or more conditions. For example, in cases where a transmitting antenna and a receiving antenna are relatively close (e.g., as compared to a distance threshold based on antenna apertures and a carrier frequency).

SUMMARY

The described techniques relate to improved methods, systems, devices, and apparatuses that support line of sight (LOS) multiple input multiple output (MIMO) signaling aspects. In some examples, a user equipment (UE) may share one or more capabilities with a network device, for example, a base station. For example, the UE may transmit a capability message to the base station including one or more UE capabilities associated with performing LOS communications. In such examples, the UE and the base station may perform an LOS MIMO configuration phase. For example, the LOS MIMO configuration phase may include a misalignment compensation procedure, a k-factor estimation procedure, a distance estimation and report back phase, a mode indication (e.g., indicating whether LOS mode may be used), a precoder indication, or any combination thereof, supporting LOS MIMO communications between the UE and the base station.

A method for wireless communication at a wireless device is described. The method may include transmitting, to a network node, a capability message indicating that the wireless device supports a LOS mode, receiving, from the network node in response to the capability message, a control message indicating activation of the LOS mode and at least one LOS mode parameter based at least in part on a channel measurement associated with a wireless channel between the wireless device and the network node indicating that the wireless channel satisfies a LOS path criterion, and communicating a message with the network node in accordance with the LOS mode parameter.

An apparatus for wireless communication at a wireless device is described. The apparatus may include a processor, memory coupled with the processor, and instructions stored in the memory. The instructions may be executable by the processor to cause the apparatus to transmit, to a network node, a capability message indicating that the wireless device supports a LOS mode, receive, from the network node in response to the capability message, a control message indicating activation of the LOS mode and at least one LOS mode parameter based at least in part on a channel measurement associated with a wireless channel between the wireless device and the network node indicating that the wireless channel satisfies a LOS path criterion, and communicate a message with the network node in accordance with the LOS mode parameter.

Another apparatus for wireless communication at a wireless device is described. The apparatus may include means for transmitting, to a network node, a capability message indicating that the wireless device supports a LOS mode, means for receiving, from the network node in response to the capability message, a control message indicating activation of the LOS mode and at least one LOS mode parameter based at least in part on a channel measurement associated with a wireless channel between the wireless device and the network node indicating that the wireless channel satisfies a LOS path criterion, and means for communicating a message with the network node in accordance with the LOS mode parameter.

A non-transitory computer-readable medium storing code for wireless communication at a wireless device is described. The code may include instructions executable by a processor to transmit, to a network node, a capability message indicating that the wireless device supports a LOS mode, receive, from the network node in response to the capability message, a control message indicating activation of the LOS mode and at least one LOS mode parameter based at least in part on a channel measurement associated with a wireless channel between the wireless device and the network node indicating that the wireless channel satisfies a LOS path criterion, and communicate a message with the network node in accordance with the LOS mode parameter.

Some examples of the method, apparatuses, and non-transitory computer-readable medium described herein may further include operations, features, means, or instructions for receiving a reference signal from the network node for performing the channel measurement associated with the wireless channel between the wireless device and the network node, where the reference signal includes one of a channel state information reference signal (CSI-RS) or a dedicated downlink reference signal for the LOS mode.

Some examples of the method, apparatuses, and non-transitory computer-readable medium described herein may further include operations, features, means, or instructions for transmitting a measurement report to the network node, the measurement report indicating the channel measurement based on receiving the reference signal.

In some examples of the method, apparatuses, and non-transitory computer-readable medium described herein, transmitting the measurement report may include operations, features, means, or instructions for transmitting a CSI report indicating the channel measurement.

In some examples of the method, apparatuses, and non-transitory computer-readable medium described herein, one or more bit fields of the CSI report include a channel quality indicator (CQI), a precoding matrix indicator (PMI), a rank indicator (RI), or any combination thereof, the one or more bit fields indicating the channel measurement.

In some examples of the method, apparatuses, and non-transitory computer-readable medium described herein, transmitting the CSI report may include operations, features, means, or instructions for transmitting the CSI report based on receiving a trigger included in a medium access control control element (MAC-CE) or downlink control information (DCI).

In some examples of the method, apparatuses, and non-transitory computer-readable medium described herein, transmitting the measurement report may include operations, features, means, or instructions for transmitting a MAC-CE indicating the channel measurement based on an expiration of a timer or the channel measurement satisfying a threshold.

Some examples of the method, apparatuses, and non-transitory computer-readable medium described herein may further include operations, features, means, or instructions for transmitting a reference signal to the network node for the network node to perform the channel measurement associated with the wireless channel between the wireless device and the network node, where the reference signal includes one of a sounding reference signal (SRS) or a dedicated uplink reference signal for the LOS mode.

Some examples of the method, apparatuses, and non-transitory computer-readable medium described herein may further include operations, features, means, or instructions for receiving a request for the reference signal, where transmitting the reference signal may be based on receiving the request.

Some examples of the method, apparatuses, and non-transitory computer-readable medium described herein may further include operations, features, means, or instructions for receiving a measurement report from the network node, the measurement report indicating the channel measurement.

In some examples of the method, apparatuses, and non-transitory computer-readable medium described herein, receiving the measurement report may include operations, features, means, or instructions for receiving a MAC-CE indicating the channel measurement based on an expiration of a timer or the channel measurement satisfying a threshold.

In some examples of the method, apparatuses, and non-transitory computer-readable medium described herein, receiving the measurement report may include operations, features, means, or instructions for receiving DCI indicating the channel measurement.

Some examples of the method, apparatuses, and non-transitory computer-readable medium described herein may further include operations, features, means, or instructions for receiving the control message, where the at least one LOS mode parameter includes a bit indicating a comb pattern that may have a comb size greater than two for a demodulation reference signal (DMRS) based on the activation of the LOS mode, where the communicating the message may be in accordance with the comb pattern for the DMRS.

Some examples of the method, apparatuses, and non-transitory computer-readable medium described herein may further include operations, features, means, or instructions for receiving the control message, where the at least one LOS mode parameter includes a bit field indicating an index to a table that identifies a comb pattern that may have a comb size greater than two for a DMRS based on the activation of the LOS mode, where the communicating the message may be in accordance with the comb pattern for the DMRS.

Some examples of the method, apparatuses, and non-transitory computer-readable medium described herein may further include operations, features, means, or instructions for receiving the control message, where the at least one LOS mode parameter indicates a number of layers and a set of modulation and coding scheme (MCS) indices, where each MCS index in the set of MCS indices corresponds to at least one layer of the number of layers, and where the communicating the message may include operations, features, means, or instructions for transmitting the message based on the control message.

Some examples of the method, apparatuses, and non-transitory computer-readable medium described herein may further include operations, features, means, or instructions for determining a number of layers, a rank, or both, corresponding to the message that includes a data transmission based at least in part on the set of MCS indices indicated in the control message.

In some examples of the method, apparatuses, and non-transitory computer-readable medium described herein, the control message includes the set of MCS indices corresponding to the number of layers.

In some examples of the method, apparatuses, and non-transitory computer-readable medium described herein, the control message includes an index indicating the set of MCS indices corresponding to the number of layers.

In some examples of the method, apparatuses, and non-transitory computer-readable medium described herein, the control message includes an antenna port field corresponding to a subset of DMRS ports on which to transmit a DMRS and a field indicating a number of layers, a rank, or both and the number of layers, the rank, or both may be less than, equal to, or greater than a quantity of DMRS ports in the subset of DMRS ports and corresponds to a number of layers for the message that includes a data transmission.

Some examples of the method, apparatuses, and non-transitory computer-readable medium described herein may further include operations, features, means, or instructions for receiving control signaling from the network node, the control signaling indicating a precoding codebook including a set of multiple precoding vectors, where the at least one LOS mode parameter indicates a precoding vector of the set of multiple precoding vectors and where the message may be precoded for transmission using the precoding vector.

In some examples of the method, apparatuses, and non-transitory computer-readable medium described herein, the control message may be a DCI message including a field indicating the precoding vector.

In some examples of the method, apparatuses, and non-transitory computer-readable medium described herein, the field indicating the precoding vector may be a transmit PMI field.

In some examples of the method, apparatuses, and non-transitory computer-readable medium described herein, the control message may be a MAC-CE including a field indicating the precoding vector.

In some examples of the method, apparatuses, and non-transitory computer-readable medium described herein, the capability message indicates that the wireless device may be a relay as well as one or more relay capabilities.

In some examples of the method, apparatuses, and non-transitory computer-readable medium described herein, the one or more relay capabilities include a physical alignment capability, a penetration loss capability, a mobility capability, or any combination thereof.

In some examples of the method, apparatuses, and non-transitory computer-readable medium described herein, the channel measurement may be a k-factor estimation.

In some examples of the method, apparatuses, and non-transitory computer-readable medium described herein, the capability message indicates a number of antenna panels, an antenna panel configuration, one or more sounding capabilities, one or more alignment capabilities, support of a LOS multiple input multiple output reference signal, a misalignment compensation capability, reporting capabilities, a mobility capability, or any combination thereof.

In some examples of the method, apparatuses, and non-transitory computer-readable medium described herein, receiving the control message may include operations, features, means, or instructions for receiving the control message including a bit indicating activation of the LOS mode.

A method for wireless communication at a network node is described. The method may include receiving, from a wireless device, a capability message indicating that the wireless device supports a LOS mode, transmitting, to the wireless device in response to the capability message, a control message indicating activation of the LOS mode and at least one LOS mode parameter based on a channel measurement associated with a wireless channel between the wireless device and the network node indicating that the wireless channel satisfies a LOS path criterion, and communicating a message with the wireless device in accordance with the LOS mode parameter.

An apparatus for wireless communication at a network node is described. The apparatus may include a processor, memory coupled with the processor, and instructions stored in the memory. The instructions may be executable by the processor to cause the apparatus to receive, from a wireless device, a capability message indicating that the wireless device supports a LOS mode, transmit, to the wireless device in response to the capability message, a control message indicating activation of the LOS mode and at least one LOS mode parameter based on a channel measurement associated with a wireless channel between the wireless device and the network node indicating that the wireless channel satisfies a LOS path criterion, and communicate a message with the wireless device in accordance with the LOS mode parameter.

Another apparatus for wireless communication at a network node is described. The apparatus may include means for receiving, from a wireless device, a capability message indicating that the wireless device supports a LOS mode, means for transmitting, to the wireless device in response to the capability message, a control message indicating activation of the LOS mode and at least one LOS mode parameter based on a channel measurement associated with a wireless channel between the wireless device and the network node indicating that the wireless channel satisfies a LOS path criterion, and means for communicating a message with the wireless device in accordance with the LOS mode parameter.

A non-transitory computer-readable medium storing code for wireless communication at a network node is described. The code may include instructions executable by a processor to receive, from a wireless device, a capability message indicating that the wireless device supports a LOS mode, transmit, to the wireless device in response to the capability message, a control message indicating activation of the LOS mode and at least one LOS mode parameter based on a channel measurement associated with a wireless channel between the wireless device and the network node indicating that the wireless channel satisfies a LOS path criterion, and communicate a message with the wireless device in accordance with the LOS mode parameter.

Some examples of the method, apparatuses, and non-transitory computer-readable medium described herein may further include operations, features, means, or instructions for transmitting a reference signal to the wireless device for performing the channel measurement associated with the wireless channel between the wireless device and the network node, where the reference signal includes one of a CSI-RS or a dedicated downlink reference signal for the LOS mode.

Some examples of the method, apparatuses, and non-transitory computer-readable medium described herein may further include operations, features, means, or instructions for receiving a measurement report from the wireless device, the measurement report indicating the channel measurement based on transmitting the reference signal.

In some examples of the method, apparatuses, and non-transitory computer-readable medium described herein, receiving the measurement report may include operations, features, means, or instructions for receiving a CSI report indicating the channel measurement.

In some examples of the method, apparatuses, and non-transitory computer-readable medium described herein, one or more bit fields of the CSI report include a CQI, a PMI, an RI, or any combination thereof, the one or more bit fields indicating the channel measurement.

In some examples of the method, apparatuses, and non-transitory computer-readable medium described herein, receiving the measurement report may include operations, features, means, or instructions for receiving the CSI report based on transmitting a trigger included in a MAC-CE or DCI.

In some examples of the method, apparatuses, and non-transitory computer-readable medium described herein, receiving the measurement report may include operations, features, means, or instructions for receiving a MAC-CE indicating the channel measurement based on an expiration of a timer or the channel measurement satisfying a threshold.

Some examples of the method, apparatuses, and non-transitory computer-readable medium described herein may further include operations, features, means, or instructions for receiving a reference signal from the wireless device for the network node to perform the channel measurement associated with the wireless channel between the wireless device and the network node, where the reference signal includes one of an SRS or a dedicated uplink reference signal for the LOS mode.

Some examples of the method, apparatuses, and non-transitory computer-readable medium described herein may further include operations, features, means, or instructions for transmitting a request for the reference signal, where receiving the reference signal may be based on transmitting the request.

Some examples of the method, apparatuses, and non-transitory computer-readable medium described herein may further include operations, features, means, or instructions for transmitting a measurement report to the wireless device, the measurement report indicating the channel measurement.

In some examples of the method, apparatuses, and non-transitory computer-readable medium described herein, transmitting the measurement report may include operations, features, means, or instructions for transmitting a MAC-CE indicating the channel measurement based on an expiration of a timer or the channel measurement satisfying a threshold.

In some examples of the method, apparatuses, and non-transitory computer-readable medium described herein, transmitting the measurement report may include operations, features, means, or instructions for transmitting DCI indicating the channel measurement.

Some examples of the method, apparatuses, and non-transitory computer-readable medium described herein may further include operations, features, means, or instructions for transmitting the control message, where the at least one LOS mode parameter includes a bit indicating a comb pattern that may have a comb size greater than two for a DMRS based on the activation of the LOS mode, where receiving the message may be in accordance with the comb pattern for the DMRS.

Some examples of the method, apparatuses, and non-transitory computer-readable medium described herein may further include operations, features, means, or instructions for transmitting the control message, where the at least one LOS mode parameter includes a bit field indicating an index to a table that identifies a comb pattern that may have a comb size greater than two for a DMRS based on the activation of the LOS mode, where receiving the message may be in accordance with the comb pattern for the DMRS.

Some examples of the method, apparatuses, and non-transitory computer-readable medium described herein may further include operations, features, means, or instructions for transmitting the control message, where the at least one LOS mode parameter indicates a number of layers and a set of MCS indices, where each MCS index in the set of MCS indices corresponds to at least one layer of the number of layers, and where the communicating the message may include operations, features, means, or instructions for receiving the message based on the control message.

In some examples of the method, apparatuses, and non-transitory computer-readable medium described herein, the control message includes the set of MCS indices corresponding to the number of layers.

In some examples of the method, apparatuses, and non-transitory computer-readable medium described herein, the control message includes an index indicating the set of MCS indices corresponding to the number of layers.

In some examples of the method, apparatuses, and non-transitory computer-readable medium described herein, the control message includes an antenna port field corresponding to a subset of DMRS ports on which to transmit a DMRS and a field indicating a number of layers, a rank, or both and the number of layers, the rank, or both may be less than, equal to, or greater than a quantity of DMRS ports in the subset of DMRS ports and corresponds to a number of layers for the message that includes a data transmission.

Some examples of the method, apparatuses, and non-transitory computer-readable medium described herein may further include operations, features, means, or instructions for transmitting control signaling from the network node, the control signaling indicating a precoding codebook including a set of multiple precoding vectors, where the at least one LOS mode parameter indicates a precoding vector of the set of multiple precoding vectors and where the message may be precoded using the precoding vector.

In some examples of the method, apparatuses, and non-transitory computer-readable medium described herein, the control message may be a DCI message including a field indicating the precoding vector.

In some examples of the method, apparatuses, and non-transitory computer-readable medium described herein, the field indicating the precoding vector may be a transmit PMI field.

In some examples of the method, apparatuses, and non-transitory computer-readable medium described herein, the control message may be a MAC-CE including a field indicating the precoding vector.

In some examples of the method, apparatuses, and non-transitory computer-readable medium described herein, the capability message indicates that the wireless device may be a relay as well as one or more relay capabilities.

In some examples of the method, apparatuses, and non-transitory computer-readable medium described herein, the one or more relay capabilities include a physical alignment capability, a penetration loss capability, a mobility capability, or any combination thereof.

In some examples of the method, apparatuses, and non-transitory computer-readable medium described herein, the channel measurement may be a k-factor estimation.

In some examples of the method, apparatuses, and non-transitory computer-readable medium described herein, the capability message indicates a number of antenna panels, an antenna panel configuration, one or more sounding capabilities, one or more alignment capabilities, support of a LOS multiple input multiple output reference signal, a misalignment compensation capability, reporting capabilities, a mobility capability, or any combination thereof.

In some examples of the method, apparatuses, and non-transitory computer-readable medium described herein, transmitting the control message may include operations, features, means, or instructions for transmitting the control message including a bit indicating activation of the LOS mode.

BRIEF DESCRIPTION OF THE DRAWINGS

FIGS. 13 through 18 show flowcharts illustrating methods that support LOS MIMO signaling aspects in accordance with aspects of the present disclosure.

DETAILED DESCRIPTION

Some wireless communications systems may support line of sight (LOS) multiple input multiple output (MIMO) communications. In some examples, LOS MIMO may provide high multiplexing gain with the satisfaction of one or more conditions. For example, in cases where a transmitting antenna and a receiving antenna are relatively close (e.g., as compared to a distance threshold based on antenna apertures and a carrier frequency). Enhanced performance may be captured in cases where transmitting and receiving arrays are aligned. That is, antenna array misalignment may result in relatively poor signal quality as compared to a signal quality associated with perfectly aligned antennas. However, such communications systems may lack an exchange of signaling supporting LOS communication configurations.

In some examples, a user equipment (UE) (e.g., a relay, a smart repeater, an IAB node) may share one or more capabilities with a network node, for example, a base station. For example, the UE may transmit a capability message to the base station including one or more UE capabilities. In some examples, the capability message may include an indication of a number of antenna panels at the UE, an antenna panel configuration, one or more sounding capabilities (e.g., no sounding, limited sounding, full sounding), or a combination thereof. Further, the UE may transmit the capability message including one or more alignment capabilities such as a support of physical alignment (e.g., via a motor that controls mechanical tilt and rotation of an antenna panel), support of an LOS MIMO specific alignment reference signal, receiver-side misalignment compensation, reporting capabilities, or a combination thereof. Additionally, in some cases, the UE may be a relay and may transmit the capability message including a mobility capability (e.g., indicating that the UE is mobile or in a fixed location).

In such examples, the UE and the base station may perform an LOS MIMO configuration phase. For example, the LOS MIMO configuration phase may include a misalignment compensation procedure, a k-factor estimation procedure, a distance estimation and report back phase, a mode indication (e.g., indicating whether LOS mode may be used), a precoder indication, or any combination thereof, supporting LOS MIMO communications between the UE and the base station.

Aspects of the disclosure are initially described in the context of wireless communications systems. Aspects of the disclosure are then described in the context of a resource diagram and a process flow. Aspects of the disclosure are further illustrated by and described with reference to apparatus diagrams, system diagrams, and flowcharts that relate to LOS MIMO signaling aspects.

Figure 1:
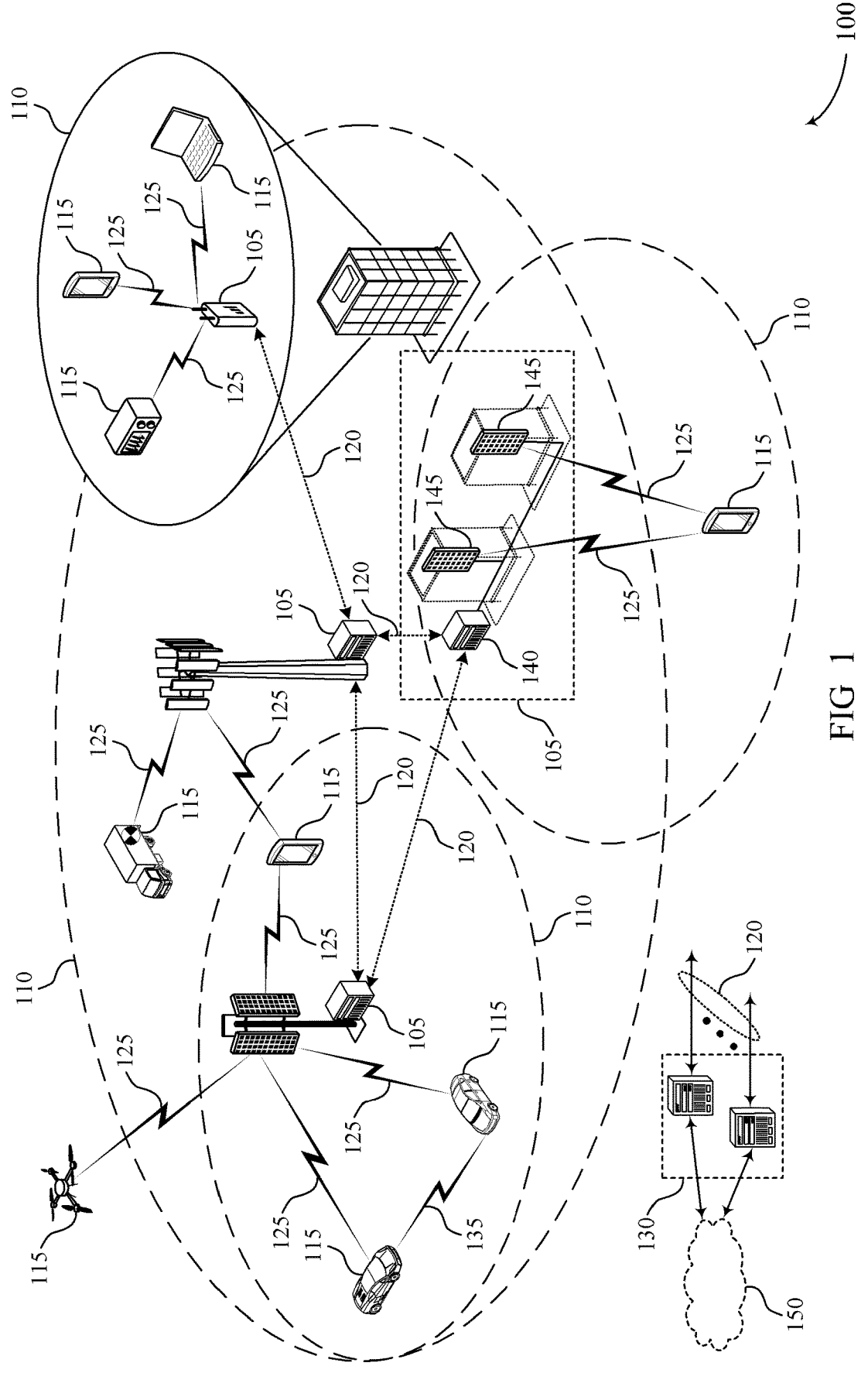
FIGS. 1 and 2 illustrate examples of wireless communications systems that support line of sight (LOS) multiple input multiple output (MIMO) signaling aspects in accordance with aspects of the present disclosure.

FIG. 1 illustrates an example of a wireless communications system 100 that supports LOS MIMO signaling aspects in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems may support LOS MIMO communications. In some examples, LOS MIMO may provide high multiplexing gain with the satisfaction of one or more conditions. For example, in cases where a transmitting antenna and a receiving antenna are relatively close (e.g., as compared to a distance threshold based on antenna apertures and a carrier frequency). Enhanced performance may be captured in cases where transmitting and receiving arrays are aligned. That is, antenna array misalignment may result in relatively poor signal quality as compared to a signal quality associated with perfectly aligned antennas. However, such communications systems may lack an exchange of signaling supporting LOS communication configurations.

In some examples, a UE 115 (e.g., a relay, a smart repeater, an IAB node) may share one or more capabilities with a network node, for example, a base station 105. For example, the UE 115 may transmit a capability message to the base station 105 including one or more UE 115 capabilities. In some examples, the capability message may include an indication of a number of antenna panels at the UE 115, an antenna panel configuration, one or more sounding capabilities (e.g., no sounding, limited sounding, full sounding), or a combination thereof. Further, the UE 115 may transmit the capability message including one or more alignment capabilities such as a support of physical alignment (e.g., via a motor that controls mechanical tilt and rotation of an antenna panel), support of an LOS MIMO specific alignment reference signal, receiver-side misalignment compensation, reporting capabilities, or a combination thereof. Additionally, in some cases, the UE 115 may be a relay and may transmit the capability message including a mobility capability (e.g., indicating that the UE is mobile or in a fixed location).

In such examples, the UE 115 and the base station 105 may perform an LOS MIMO configuration phase. For example, the LOS MIMO configuration phase may include a misalignment compensation procedure, a k-factor estimation procedure, a distance estimation and report back phase, a mode indication (e.g., indicating whether LOS mode may be used), a precoder indication, or any combination thereof, supporting LOS MIMO communications between the UE 115 and the base station 105.

Figure 2:
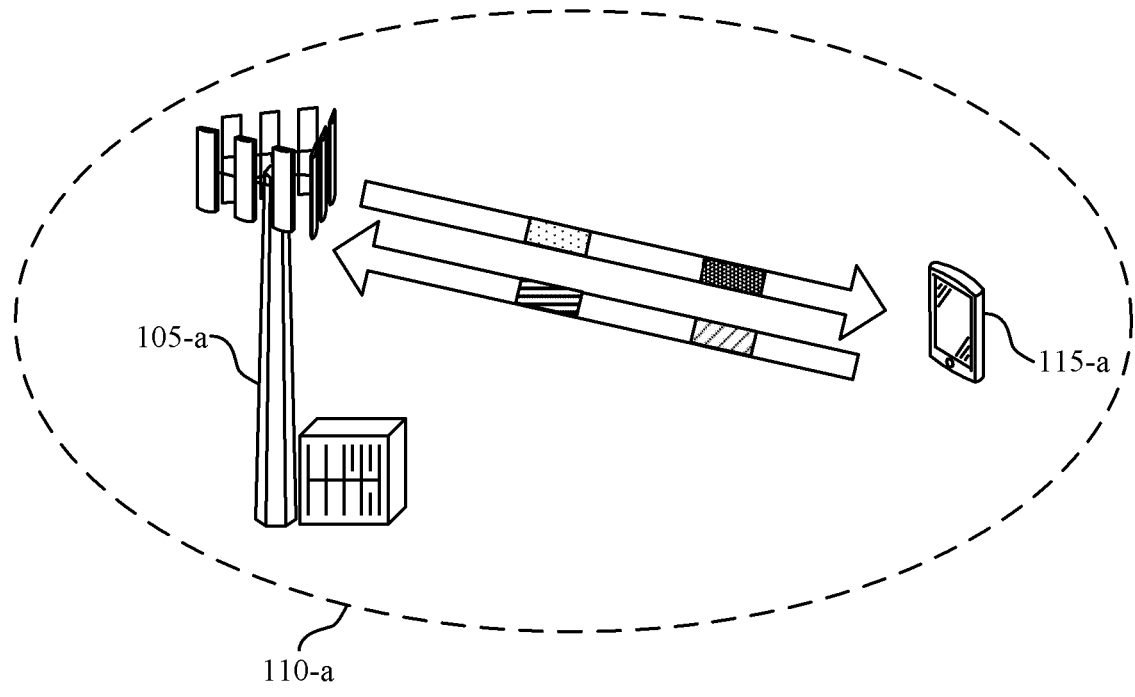
Figure 2:
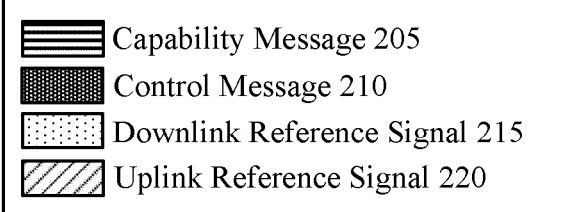

FIG. 2 illustrates an example of a wireless communications system 200 that supports LOS MIMO signaling aspects in accordance with aspects of the present disclosure. The wireless communications system 200 may implement or be implemented by aspects of the wireless communications system 100. For example, wireless communications system 200 may include a base station 105-a (e.g., a network node) and a UE 115-a which may be examples of corresponding devices as described with reference to FIG. 1. In some examples, the UE 115-a and the base station 105-a may exchange signaling supporting LOS-MIMO communications at the UE 115-a, the base station 105-a or both.

Some wireless communications systems, such as wireless communications system 200, may support LOS MIMO. In some examples, LOS MIMO may provide high multiplexing gain with the satisfaction of one or more conditions. For example, LOS MIMO may provide high multiplexing gain in cases where a distance between a transmitting antenna and a receiving antenna is less than a distance threshold, where the distance threshold may depend on apertures of the transmitting antenna, the receiving antenna, a carrier frequency, or a combination thereof. Phrased alternatively LOS MIMO may provide high multiplexing gain in cases where the transmitting antenna and the receiving antenna are relatively close (e.g., as compared to a distance threshold based on antenna apertures and a carrier frequency). In some examples, LOS MIMO may provide high multiplexing gain in cases where devices use accurate LOS MIMO precoders. For example, a transmitting device may acquire channel knowledge (e.g., channel conditions, channel quality) and may generate an LOS MIMO precoder based thereon. Additionally or alternatively, communicating devices may feedback distance information to one another and may perform misalignment compensation based thereon, for example, for generating an accurate LOS MIMO precoder.

There are multiple deployment scenarios where wireless communications systems perform LOS MIMO differently. For example, LOS MIMO may be performed in a backhaul link between a network node (e.g., a gNB, an IAB node, a sidelink UE 115) and a relay (e.g., an IAB node, a smart repeater, a customer provided equipment (CPE), drones). In another example, LOS MIMO may be performed in an access link between a network node (or relay) and a UE 115.

In some examples, wireless devices may estimate communications channels (e.g., for LOS spatial multiplexing (LSM), M-MIMO) in accordance with a channel model. For example, wireless devices may estimate communications channels in accordance with a Rician channel model. That is, Equation 1 may be used to estimate communications channels.

$$H = aH_{LOS} + bH_{NLOS} \tag{1}$$

In Equation 1, $H_{LOS}$ may represent an LOS channel metric, and may be equal to $$H_{LOS} = \frac{\exp\left(-i2\pi\frac{r_{jk}}{\lambda}\right)}{\frac{r_{jk}}{\lambda}},$$

where $r_{jk}$ may be a distance between a transmitter antenna and a receiver antenna and $\lambda$ may be a wavelength of a carrier frequency. In some examples, $H_{NLOS}$ may represent an non-LOS (NLOS) channel metric and may be determined by a Raleigh distribution, a clustered delay line (CDL), a tapped delay line (TDL), or a combination thereof. In some examples, a and b are weight factors associated with the channel being composed of an LOS component and an NLOS component, respectively. For example, $a^2+b^2=1$, where $a^2$ may be a percentage of the channel being composed of LOS communications. In some cases, LSM and M-MIMO may be compared at least in accordance with Equation 1 and referencing Table 1.

$$h_{mn} \alpha \frac{\exp\left(-i2\pi\frac{r_{mn}}{\lambda}\right)}{r_{mn}}$$

For example, multiplexing gain of an LOS MIMO channel may depend on an antenna separation as well as a distance between a transmitting and receiving array. Further, enhanced performance may be captured in cases where transmitting and receiving arrays are aligned. That is, antenna array misalignment may result in relatively poor signal quality as compared to a signal quality associated with perfectly aligned antennas. However, such communications systems may lack an exchange of signaling supporting LOS communication configurations.

In some examples, the UE 115-a (e.g., a relay, a smart repeater, an IAB node) may share one or more capabilities with a network node, for example, the base station 105-a. For example, the UE 115-a may transmit capability message 205 to the base station 105-a including one or more UE capabilities. In some examples, the UE 115-a may transmit the capability message 205 including an indication of a number of antenna panels at the UE 115-a, an antenna panel configuration, one or more sounding capabilities (e.g., no sounding, limited sounding, full sounding), or a combination thereof. Further, the UE 115-a may transmit the one or more alignment capabilities such as a support of physical alignment (e.g., via a motor that controls mechanical tilt and rotation of an antenna panel), support of an LOS MIMO specific alignment reference signal, receiver-side misalignment compensation, reporting capabilities, or a combination thereof. Additionally, in some cases, the UE 115-a may be a relay and may transmit the capability message 205 including a mobility capability (e.g., indicating that the UE 115-a is mobile or in a fixed location).

In such examples, the wireless communications system 200 may include an LOS MIMO configuration phase. For example, the LOS MIMO configuration phase may include a misalignment compensation procedure, a k-factor estimation procedure, a distance estimation and report back phase,

TABLE 1

|  | LSM | M-MIMO |
| --- | --- | --- |
| Antenna Arrays | Circular, 1D, 2D | 1D, 2D |
| Channel Matrix | Strong LOS Component (a >> b) | Weak LOS Component (a << b) |
| SVD-based Precoder | Implicit, benefitting from the special structure of channel (e.g., limited, no joint caching and downlink resource sharing optimization framework (CSF)) | Explicit, CSF may be used at the transmitter side to compute SVD |

In Table 1, the antenna arrays row represents the different types of antenna arrays that may be used for LSM and M-MIMO. Further, the channel matrix row represents the dominating weight factor in Equation 1 that may aid a wireless device in determining whether to use LSM or M-MIMO. For example, in cases where there is a strong LOS component, a wireless device may determine to use LSM. In some cases, LSM and M-MIMO may differ in a singular value decomposition (SVD) precoder, where determining a precoder may be implicit in cases where devices use LSM and explicit in cases where devices use M-MIMO.

In some examples, the structure of an LOS MIMO channel may be exploited to achieve high multiplexing gain.

a mode indication (e.g., indicating whether LOS mode may be used), a precoder indication, or any combination thereof.

In some examples, in the LOS MIMO configuration phase, an antenna panel configuration may be added, for example, in an RRC configuration message transmitted from the base station 105-a to the UE 115-a. In some examples, the antenna panel configuration may include an indication of a type of antenna geometry (e.g., uniform linear array (ULA), uniform circular array (UCA), uniform rectangular array (URA)) as well as one or more parameters associated with each antenna geometry. For example, the one or more parameters may include, for ULA, a number of antennas (e.g., N_H, N_V), an antenna spacing, (e.g., d_H, d_V), a polarization, or a combination thereof. In some cases, for UCA configurations, the one or more parameters may include, polarization and an offset angle, a radius, and a number of antennas. In some other cases, for UCA configurations, the one or more parameters may include polarization and an offset angle, a radius, and an antenna spacing. In yet other cases, for UCA configurations, the one or more parameters may include polarization and an offset angle, an antenna spacing, and a number of antennas. In some examples, the base station 105-*a* may transmit the RRC configuration message to the UE 115-*a* including a mapping for an ordering of antenna arrays at the base station 105-*a* (e.g., in cases where partial sounding of a partial network node array occur).

In some examples, one or more information elements may be configured for UE capabilities related to LOS mode communications and the base station 105-*a* may signal configuration to the UE 115-*a* based one or more sounding capabilities. For example, the UE 115-*a* may signal capabilities, in capability message 205, to support the base station 105-*a* configuring the UE 115-*a* for LOS communications. In some examples, the UE 115-*a* may transmit the capability message including a sounding capability (e.g., no sounding, partial sounding, full sounding). In cases where the UE 115-*a* supports sounding, the base station 105-*a* may further configure or trigger sounding procedures (e.g., associated with k-factor estimation). In some examples, the UE 115-*a* may transmit the capability message 205 including an alignment capability (e.g., a physical alignment capability such as rotation via a motor, a digital alignment capability such as post-processing, support of LOS reference signals, support of alignment reporting such as periodic reporting). In cases where the UE 115-*a* supports digital alignment, the base station may further configure or trigger alignment or realignment procedure. In some examples, the UE 115-*a* (e.g., a relay device or a customer premise equipment (CPE)) may transmit the capability message 205 including mobility capabilities, for example, indicating whether the UE 115-*a* is in a fixed location, mobile, or the like.

The base station 105-*a* may determine to activate or deactivate LOS mode communications with the UE 115-*a*, for example, based on a k-factor estimation. In such examples, the base station 105-*a* may transmit a control message 210, to the UE 115-*a*, indicating activation (or deactivation) of LOS mode communications. In some cases, the base station 105-*a* may transmit control signaling (e.g., an RRC message) to the UE 115-*a*, including one bit to indicate whether LOS mode is on or off (e.g., signaling activation or deactivation may be detectable). In cases where the base station 105-*a* activates LOS mode communications, the base station 105-*a* and the UE 115-*a* may perform procedures associated with LOS mode communications accordingly.

In some examples, the base station 105-*a* and the UE 115-*a* may support a k-factor estimation procedure for the LOS communication mode. In some cases, the base station 105-*a* may transmit a downlink reference signal 215 to the UE 115-*a*, where the UE 115-*a* may estimate the k-factor and may report the k-factor estimation back to the base station 105-*a*. In some examples, the base station 105-*a* may transmit the downlink reference signal 215 as a CSI-RS for k-factor estimation, where in LOS mode, a configuration field may be reused (e.g., a channel measurement field for k-factor estimation). In such examples, the UE 115-*a* may indicate the k-factor estimation in a CSI report by reusing one or more fields (e.g., bit fields associated with channel quality information (CQI), a precoder matrix indicator (PMI), a rank indicator (RI), with a specific granularity) in the CSI report. In some examples, the UE 115-*a* may indicate the k-factor estimation in a layer 2 (L2) report. For example, the UE 115-*a* may include the k-factor estimation in an uplink LOS MAC control element (MAC-CE) message. In such examples, the UE 115-*a* may include the k-factor estimation in an entry of the uplink LOS MAC-CE message configured by the base station 105-*a* in control signaling (e.g., an RRC message). In such examples, the UE 115-*a* may indicate the k-factor estimation triggered based on a timer or based on a k-factor threshold (e.g., triggered when a k-factor estimation is greater than or equal to 95%). In some examples, the UE 115-*a* may indicate the k-factor estimation in a layer 1 (L1) report. For example, the UE 115-*a* may transmit a dedicated LOS CSI report for k-factor estimation reporting (e.g., up to a some granularity) with a respective triggering mechanism (e.g., triggered by MAC-CE or downlink control information (DCI)).

In some examples, the base station 105-*a* may request an uplink reference signal 220 from the UE 115-*a* to estimate the k-factor. As such, the UE 115-*a* may receive the request and may transmit the uplink reference signal 220 to the base station 105-*a*. In some cases, the UE 115-*a* may transmit the uplink reference signal 220 as an SRS for k-factor estimation, where in LOS mode, the UE 115-*a* may use one or more usage fields in the SRS (e.g., a beam management field, a codebook based field) for k-factor estimation information. In some cases, the wireless communications system 200 may use a specific reference signal for the LOS mode with one or more usage options. For example, the UE 115-*a* may transmit the uplink reference signal 220 as an LOS mode-specific reference signal for the base station 105-*a* to estimate the k-factor. In some examples, the base station 105-*a* may report a k-factor estimation back to the UE 115-*a*. In some cases, the base station 105-*a* may transmit a downlink LOS MAC CE to the UE 115-*a*, including a k-factor estimation in one or more configured entries of the downlink LOS MAC CE (e.g., configured in RRC). In such cases, the base station 105-*a* may transmit the downlink MAC CE triggered based on a timer or based on a specific threshold k-factor. In some cases, the base station 105-*a* may transmit a DCI to the UE 115-*a*, including a k-factor estimation (e.g., in a specific field either using a bitmap or a pointer to a table of values).

In some examples, the base station 105-*a* and the UE 115-*a* may exchange reference signals to one another (e.g., instead of feeding back k-factor estimations to one another). For example, the UE 115-*a* may transmit the uplink reference signal 220 to the base station 105-*a* for the base station to measure the k-factor and the base station 105-*a* may transmit the downlink reference signal 215 to the UE 115-*a* for the UE 115-*a* to measure the k-factor. In some cases, the downlink reference signal 215, the uplink reference signal 220, or both, may be specific reference signals for LOS mode.

Additionally or alternatively, the base station 105-*a* may configure the UE 115-*a* with a LOS mode configuration such as a simplified demodulation reference signal (DMRS) port mapping, a partial port mapping, an LOS precoder, or a combination thereof. Such LOS mode configurations are described in more detail with reference to FIG. 3.

Configuring the base station 105-*a* and the UE 115-*a* to exchange signaling supporting LOS communications using the techniques as described herein may enhance device coordination, reduce communication latency, and increase signal throughput.

Figure 3A:
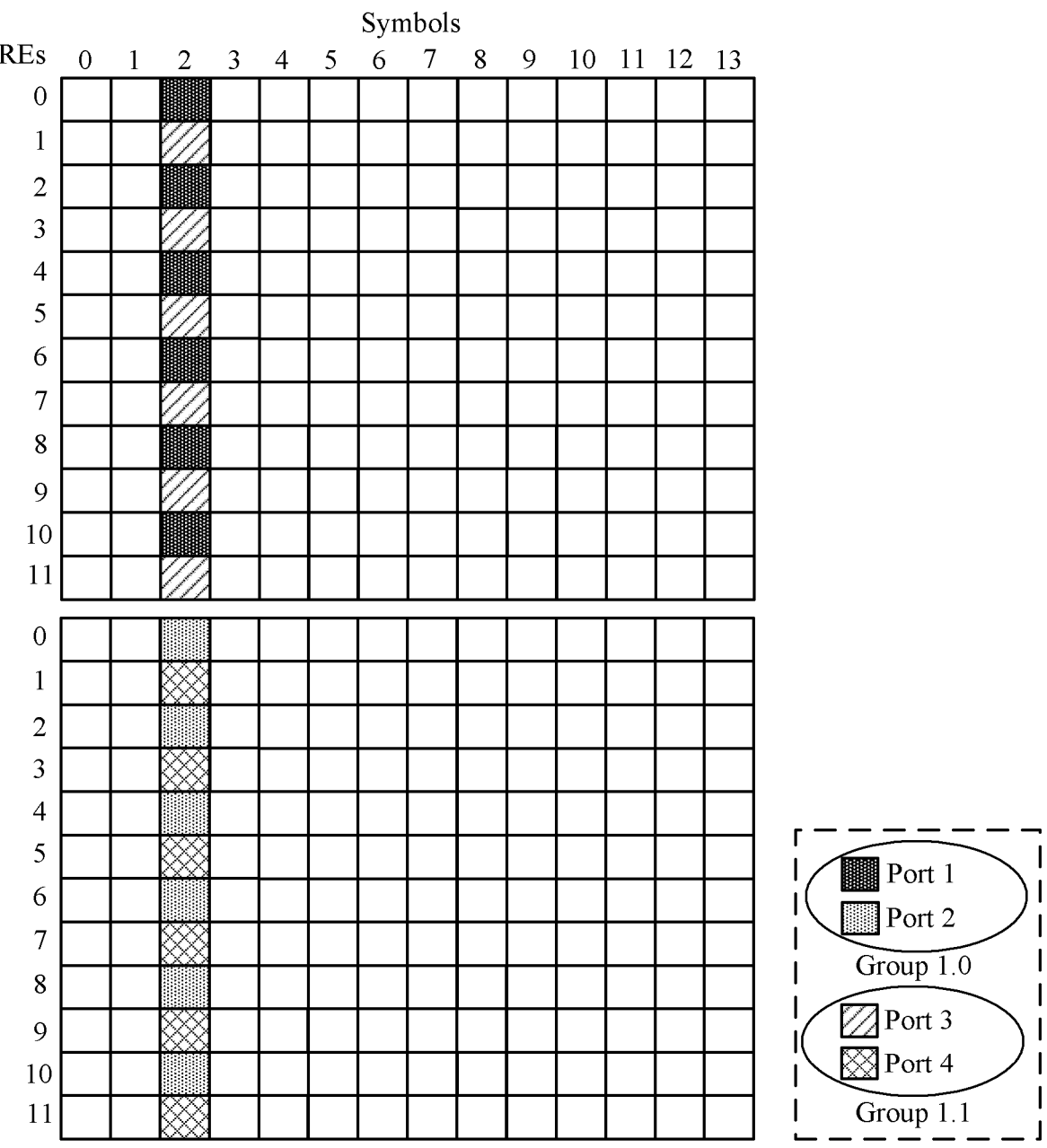
FIGS. 3A through 3C illustrate examples of resource diagrams that support LOS MIMO signaling aspects in accordance with aspects of the present disclosure.
Figure 3B:
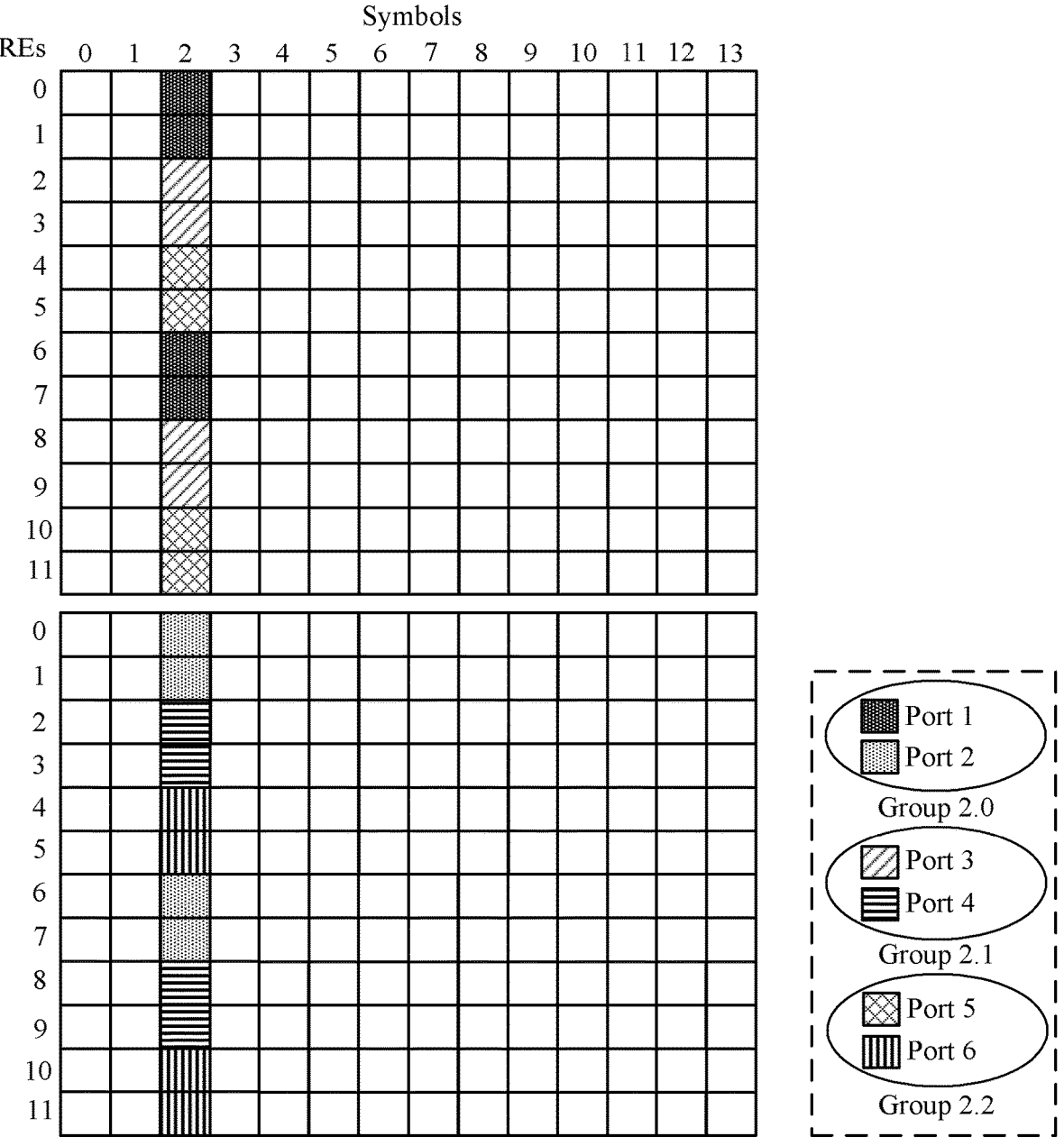
Figure 3C:
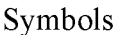

FIGS. 3A, 3B, and 3C illustrate examples of resource diagrams 300 that supports LOS MIMO signaling aspects in accordance with aspects of the present disclosure. The resource diagrams 300 may be implemented by a base station, or a UE, or both, which may be examples of a base station and a UE as described with reference to FIGS. 1 and 2. For example, a base station and a UE may exchange signaling to configure the UE to use specific DMRS port mapping structures associated with an LOS mode.

In some examples, the base station may configure the UE with one or more transmission parameters associated with a simplified DMRS for the LOS mode. In such cases, as it may be relatively simple to estimate an LOS dominant channel (e.g., LOS communications constitute more than 95% of the channel), simplifications may be implemented in DMRS sounding.

In some cases, wireless communications systems may support two types of DMRS configurations, namely, type 1 and type 2. In type 1 DMRS configurations, each DMRS port may occupy half the REs in a specific symbol. Type 1 DMRS configurations are described with reference to FIG. 3A.

FIG. 3A depicts a resource diagram 300-*a* with a comb-2 DMRS configuration (e.g., type 1 DMRS configuration), where each DMRS port may occupy half the REs in a specific symbol. In resource diagram 300-*a*, the resources corresponding to four DMRS ports may be allocated to two resource blocks with two DMRS ports associated with each resource block. That is, a DMRS port 1 in a group 1.0 may occupy half the REs in a first resource block and a DMRS port 3 in a group 1.1 may occupy the other half of the REs in the first resource block. Likewise, a DMRS port 2 in the group 1.0 may occupy half the REs in a second resource block and a DMRS port 4 in the group 1.1 may occupy the other half of the REs in the second resource block. The comb-2 DMRS configuration may be compared to a comb-3 DMRS configuration with reference to FIG. 3B.

FIG. 3B depicts a resource diagram 300-*b* with a comb-3 DMRS configuration (e.g., type 2 DMRS configuration), where each DMRS port may occupy a third of the REs in a specific symbol. In resource diagram 300-*b*, the resources corresponding to six DMRS ports may be allocated to two resource blocks with three DMRS ports associated with each resource block. That is, a DMRS port 1 in a group 2.0 may occupy a first third of the REs in a first resource block, a DMRS port 3 in a group 2.1 may occupy a second third of the REs in the first resource block, and a DMRS port 5 in a group 2.2 may occupy the last third of the REs in the first resource block. Likewise, a DMRS port 2 in the group 2.0 may occupy a first third of the REs in a second resource block, a DMRS port 4 in the group 2.1 may occupy a second third of the REs in the second resource block, and a DMRS port 6 in the group 2.2 may occupy the last third of the REs in the second resource block.

In a single DMRS symbol, some wireless communications systems may support up to 4 and 6 ports using type 1 DMRS configurations and type 2 DMRS configurations, respectively. However, for an LOS dominant channel (e.g., LOS communications constitute more than 95% of the channel), the channel may not be frequency selective. In other words, it may be easier to distinguish between frequencies, and thus multiplex, on the LOS dominant channel as compared to an NLOS dominant channel or a channel where LOS communications are not dominant. In such examples, wireless communications systems may reduce DMRS overhead and multiplex more ports in a single DMRS symbol (e.g., supporting more UEs in the uplink and more communication layers in the downlink).

In some examples, there may be several simplifications to reduce DMRS overhead and multiplex more DMRS ports. In a first example, devices communicating in an LOS mode may support a larger comb value for DMRS mapping. For example, with a comb-4 pattern, devices may be able to support up to 8 DMRS ports in a single DMRS symbol. In a second example, devices communicating in the LOS mode may support partial layer mapping to DMRS ports. For example, mapping only half of the communication layers to DMRS ports, devices may support up to 8 ports with a configuration type 1 in a single DMRS symbol.

FIG. 3C depicts a resource diagram 300-*c* with a sparser DMRS comb pattern that may be used in cases where the LOS mode is activated. The DMRS comb pattern of resource diagram 300-*c* may correspond to a type 3 DMRS configuration for a sparser comb (e.g., a comb-4 pattern). In resource diagram 300-*c*, the resources corresponding to eight DMRS ports may be allocated to two resource blocks with four DMRS ports associated with each resource block. That is, a DMRS port 1 in a group 3.0 may occupy a first fourth of the REs in a first resource block, a DMRS port 3 in a group 3.1 may occupy a second fourth of the REs in the first resource block, a DMRS port 5 in a group 3.2 may occupy a third fourth of the REs in the first resource block, and a DMRS port 7 in a group 3.3 may occupy the last fourth of the REs in the first resource block. Likewise, a DMRS port 2 in the group 3.0 may occupy a first fourth of the REs in a second resource block, a DMRS port 4 in the group 3.1 may occupy a second fourth of the REs in the second resource block, a DMRS port 6 in the group 3.2 may occupy a third fourth of the REs in the second resource block, and a DMRS port 8 in a group 3.3 may occupy the last fourth of the REs in the second resource block.

In some examples, the base station may add an additional bit in RRC signaling for type 1/type 2 DMRS configurations to select between type 1, type 2, and type 3 DMRS configurations. In such examples, the base station may select type 3 DMRS configuration for the UE to use in cases where the LOS mode is activated. In other examples, in cases where the LOS mode is activated, the base station may use the field in RRC signaling for type 1/type 2 DMRS configurations to indicate the type 3 DMRS configuration or a type 4 DMRS configuration.

To support the DMRS configurations described herein, devices may use specific tables for DMRS port mappings, such that an additional table may be defined for the type 3 DMRS configuration, a type 4 DMRS configuration, or a combination thereof. For example, a type 3 DMRS configuration with a comb-4 pattern, where the number of DMRS ports may be increased to 8 DMRS ports with the comb-4 pattern, may correspond to Table 1 (e.g., with a maxLength=1 and a number of sounded ports=2 corresponding to a rank of 2).

TABLE 1

| Value | Number of DMRS CDM group(s) without data | DMRS port(s) |
|---|---|---|
| 0 | 1 | 0, 1 |
| 1 | 2 | 0, 1 |
| 2 | 2 | 2, 3 |
| 3 | 2 | 0, 2 |
| 4 | 3 | 0, 1 |
| 5 | 3 | 2, 3 |
| 6 | 3 | 4, 5 |
| 7 | 4 | 0, 1 |
| 8 | 4 | 2, 3 |

TABLE 1-continued

| Value | Number of DMRS CDM group(s) without data | DMRS port(s) |
| --- | --- | --- |
| 9 | 4 | 4, 5 |
| 10 | 4 | 6, 7 |

In some examples, devices may be configured to use a partial port mapping, where not every DMRS port may be sounded. For example, in some wireless communications systems, a number of layers (e.g., the rank) may be equal to a number of DMRS ports and may be indicated by an antenna ports field in a DCI message (e.g., as different layers may be observed as independent channels). However, for LOS dominant channels, the channels across different layers may be significantly correlated. As such, devices may reduce DMRS overhead by configuring a subset of layers mapped to DMRS ports. For example, two out of four layers may be mapped to DMRS ports (e.g., rather than 4 out of 4 layers). In such examples, the channel of the remaining layers or the unmapped layers may be derived from the estimated channel of the sounded DMRS ports.

In some examples, the number of DMRS ports to be sounded may be indicated from an "antenna ports" field in a DCI message. For example, the base station may indicate the number of DMRS ports to be sounded to the UE in a DCI message. Additionally, the DCI message may include a field (e.g., a field that is different from the antenna port field) that includes two bits that indicates the number of layers (e.g., the rank). In some examples, sounding may depend on a dynamic indication. For example, the base station may indicate full sounding (e.g., sounding on all DMRS ports) in cases where the devices perform a k-factor estimation as described with reference to FIG. 2 and upon verification of the LOS mode (e.g., where the base station transmits a control message to the UE indicating an activation of the LOS mode). In other examples, the base station may indicate the number of DMRS ports to be sounded using the antenna ports field in a DCI message, where the number of layers may be derived from a number of MCS entries indicated by the DCI. That is, the UE may derive the number DMRS ports to be sounded based on a number of MCS entries indicated by the base station.

In some cases, wireless communications systems may use a per layer (or per mode) MCS. In such cases, there may be a significant energy difference amongst LSM modes, such that devices may separate an MCS assignment by layer. In some examples, the UE and the base station may use MCS tables corresponding to the LOS mode. The base station may signal such MCS tables to the UE via RRC signaling. In such examples, the entries of the MCS tables corresponding to the LOS mode may be vectors of MCS values for different layers. In other examples, the base station may signal such MCS tables to the UE via a DCI indication (e.g., in an MCS field) as a sequence. In such examples, the base station may signal the MCS tables to the UE using a DCI format for activated LOS mode, where in such cases the LOS mode activation may be indicated by RRC signaling.

In some examples, the UE may determine a mapping between a set of MCS indices configured for the UE and a respective number of layers. In one example, the mapping may indicate that a quantity of MCS indices included in the set of MCS indices is equal to the number of layer (e.g., four MCS indices equals four layers). The UE may receive an indication of the set of MCS indices from the base station and determine a number of layers based on the received set of MCS indices and the mapping. As one example, the base station may transmit control signaling (e.g., DCI), where the control signaling includes the set of MCS indices corresponding to a number of layers. In some examples, bits may be added to the DCI in order to indicate the set of MCS indices (e.g., a bit field may include four MCS indices). In another example, the base station may transmit control signaling (e.g., DCI) to the UE including an index indicating the set of MCS indices corresponding to a number of layer. A mapping between the DCI index and the set of MCS indices may be indicated to the UE via RRC signaling. That is, the UE may be configured with the mapping via RRC signaling.

In some examples, the devices may use codebook based uplink communications. In such examples, the UE and the base station may use a codebook type specific to the LOS mode. In some cases, the base station may transmit an RRC signal to the UE including an RRC configuration to include one or more LOS precoders (e.g., Legendre, DFT, block DFT, Walsh) for codebook based uplink communications. In such cases, the base station may indicate one of the precoders of the codebook to the UE via a DCI or a MAC CE message. In some examples, the base station may indicate the precoding to the UE by reusing a transmit precoding matrix index (TPMI) field in a DCI message. In other examples, the base station may indicate the precoder to the UE in an additional field specific to the LOS mode in the DCI message. In some examples, the base station may indicate the precoder to the UE by transmitting a downlink LOS MAC CE message including a field to indicate the precoder.

In some cases, the UE may be a relay device, where in the integration phase of a network establishment procedure, the UE may indicate one or more relay capabilities for LOS to the base station. For example, the UE may indicate a physical alignment capability (e.g., rotation), a configured penetration loss, a mobility indication, among other relay capabilities.

Figure 4:
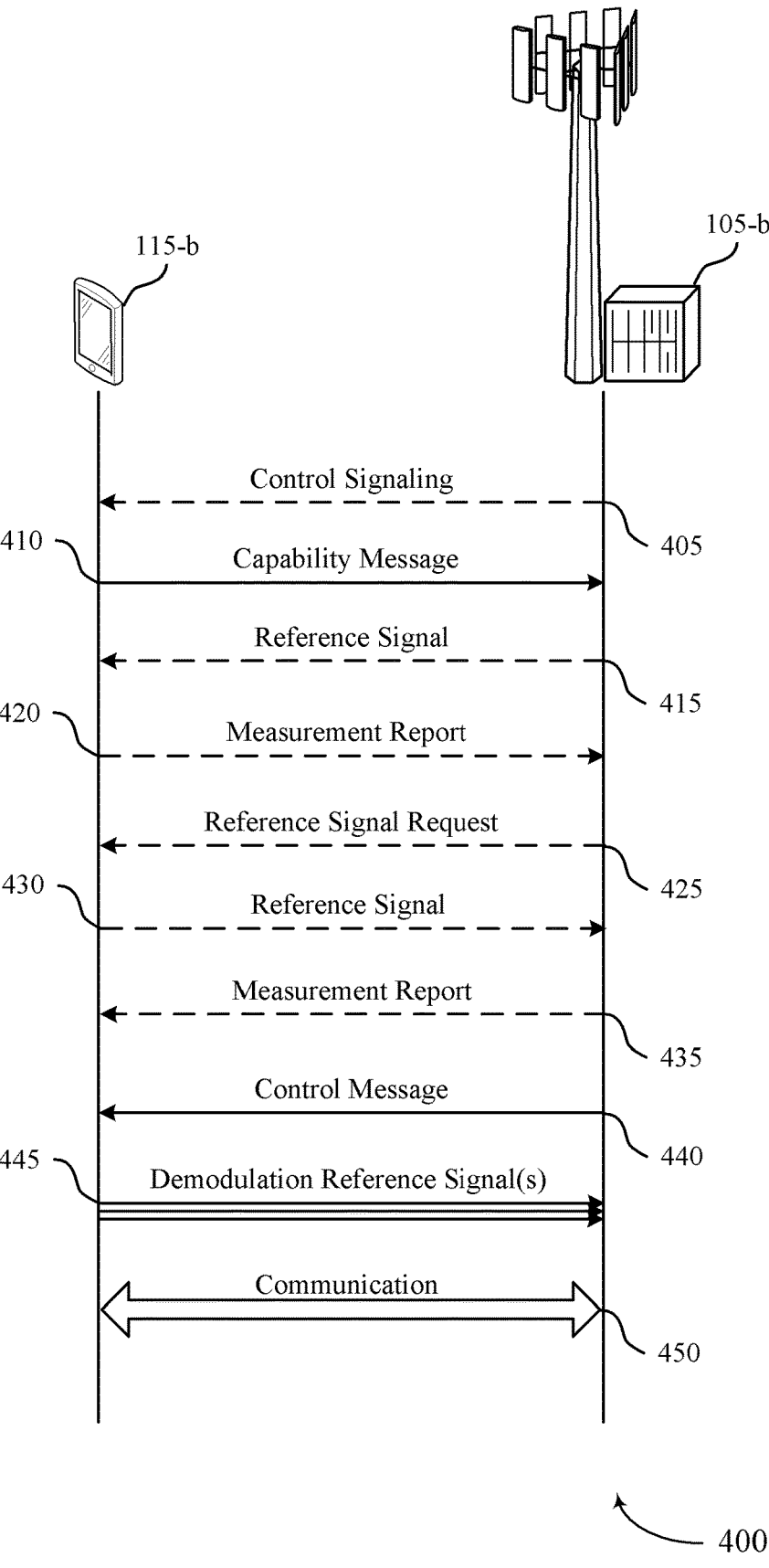
FIG. 4 illustrates an example of a process flow that supports LOS MIMO signaling aspects in accordance with aspects of the present disclosure.

FIG. 4 illustrates an example of a process flow 400 that supports LOS MIMO signaling aspects in accordance with aspects of the present disclosure. In some examples, the process flow 400 may implement aspects of wireless communications systems 100 or 200. For example, process flow 400 may include a UE 115-b and a base station 105-b (e.g., a network node), which may be examples of corresponding devices as described with reference to FIGS. 1 through 3C. In some cases, the base station 105-b and the UE 115-b may exchange signaling supporting LOS communications.

In the following description of the process flow 400, the operations may be performed (e.g., reported or provided) in a different order than the order shown, or the operations performed by the UE 115-b and the base station 105-b may be performed in different orders or at different times. For example, specific operations also may be left out of the process flow 400, or other operations may be added to the process flow 400. Further, although some operations or signaling may be shown to occur at different times for discussion purposes, these operations may actually occur at the same time.

In some examples, at 405, the base station 105-b may transmit, and the UE 115-b may receive control signaling (e.g., RRC signaling) including one or more parameters associated with LOS communications. For example, the UE 115-b may receive control signaling from the base station 105-b, the control signaling an MCS table associated with an LOS mode. In another example, the UE 115-b may receive control signaling from the base station 105-b, the control signaling indicating a precoding codebook comprising a plurality of precoding vectors associated with the LOS mode.

At 410, the UE 115-*b* may transmit, to the base station 105-*b*, a capability message indicating that the UE 115-*b* supports an LOS mode. In some examples, the capability message may indicate that the UE 115-*b* is a relay and may include one or more relay capabilities. In such examples, the one or more relay capabilities may include a physical alignment capability, a penetration loss capability, a mobility capability, or a combination thereof. In some examples, the capability message may indicate a number antenna panels, an antenna panel configuration, one or more sounding capabilities, one or more alignment capabilities, support of an LOS MIMO reference signal, a misalignment compensation capabilities, reporting capabilities, a mobility capability, or a combination thereof.

In some examples, at 415, the base station 105-*b* may transmit, and the UE 115-*b* may receive a reference signal for performing a channel measurement associated with the wireless channel between the UE 115-*b* and the base station 105-*b*. For example, the base station 105-*b* may transmit a CSI-RS to the UE 115-*b* for performing a channel measurement. In some examples, the channel measurement may be a k-factor estimation.

In some examples, at 420, the UE 115-*b* may transmit, and the base station 105-*b* may receive a measurement report, the measurement report indicating the channel measurement based at least in part on receiving the reference signal at 415.

In some examples, at 425, the UE 115-*b* may receive a request for a reference signal, where at 430, the UE 115-*b* may transmit the reference signal to the base station 105-*b* for the base station to perform a channel measurement associated with the wireless channel between the UE 115-*b* and the base station 105-*b*. In such examples, at 435, the base station 105-*b* may transmit, and the UE 115-*b* may receive a measurement report, the measurement report indicating the channel measurement.

At 440, the UE 115-*b* may receive, from the base station 105-*b* in response to the capability message, a control message indicating activation of the LOS mode and at least one LOS mode parameter based at least in part on a channel measurement associated with a wireless channel between the UE 115-*b* and the base station 105-*b* indicating that the wireless channel satisfies an LOS path criterion. In some examples, the UE 115-*b* may receive the control message including a bit indicating activation of the LOS mode. In some examples, the UE 115-*b* may receive the control message, wherein the at least one LOS mode parameter may include a bit indicating a comb 4 pattern for a DMRS based on the activation of the LOS mode. In some examples, the UE 115-*b* may receive the control message, where the at least one LOS mode parameter may include a bit field indicating an index to a table that identifies a comb 4 pattern for a DMRS based on the activation of the LOS mode.

In some examples, the UE 115-*b* may receive the control message, where the at least one LOS mode parameter may indicate a subset of DMRS ports on which to transmit a DMRS. In such examples, the control message may include a field indicating a number of layers, a rank, or both, corresponding to the subset of DMRS ports on which to transmit the DMRS signal. Additionally or alternatively, the control message may include an antenna ports field indicating the subset of DMRS ports on which to transmit a DMRS and indicating an MCS index to an MCS table, such as the MCS table indicated in the control signaling at 405. In some examples, the field may be different from the antenna ports field. In some examples, the UE 115-*b* may receive the control message including a sequence that indicates the MCS index.

In some examples, the at least one LOS mode parameter may indicate a first precoding vector of the plurality of precoding vectors, where the UE 115-*b* may precode messages for transmission using the first precoding vector. In such examples, the control message may be a DCI message including a field indicating the first precoding vector. Additionally, the field indicating the first precoding vector may be a TPMI field. In some examples, the control message may be a MAC CE including a field indicating the first precoding vector.

At 445, the UE 115-*b* may transmit one or more DMRSs to the base station 105-*b* over a number of layers corresponding to the MCS index, via the subset of DMRS ports, or a combination thereof.

At 450, the UE 115-*b* may communicate a message with the base station 105-*b* in accordance with the LOS mode parameter. For example, the UE 115-*b* may communicate the message in accordance with the comb 4 pattern for the DMRS, in accordance with the MCS index, using the first precoding vector, or a combination thereof.

Figure 5:
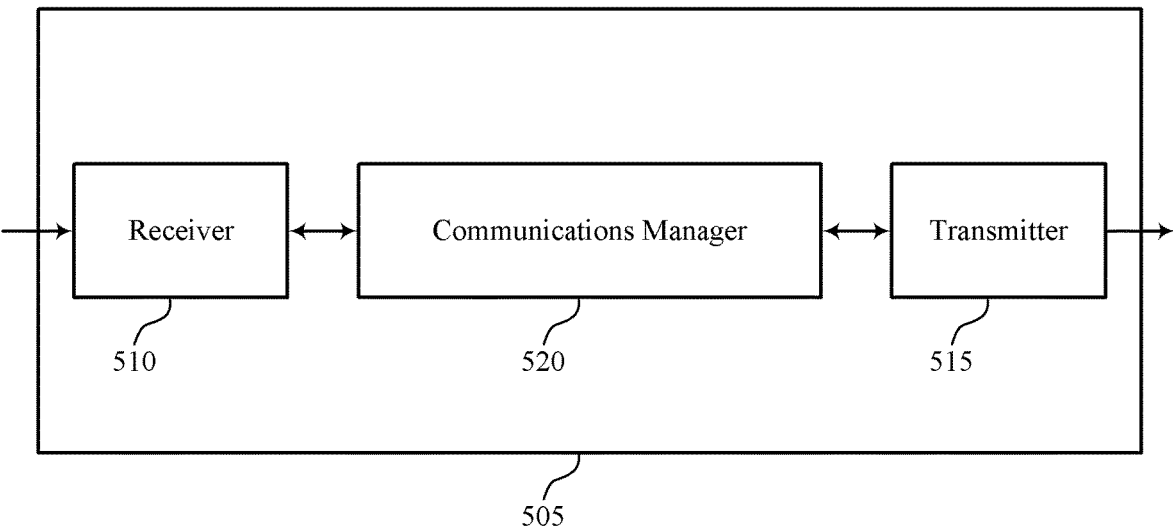
FIGS. 5 and 6 show block diagrams of devices that support LOS MIMO signaling aspects in accordance with aspects of the present disclosure.

FIG. 5 shows a block diagram 500 of a device 505 that supports LOS MIMO signaling aspects in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to LOS MIMO signaling aspects). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to LOS MIMO signaling aspects). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of LOS MIMO signaling aspects as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a wireless device in accordance with examples as disclosed herein. For example, the communications manager 520 may be configured as or otherwise support a means for transmitting, to a network node, a capability message indicating that the wireless device supports a LOS mode. The communications manager 520 may be configured as or otherwise support a means for receiving, from the network node in response to the capability message, a control message indicating activation of the LOS mode and at least one LOS mode parameter based at least in part on a channel measurement associated with a wireless channel between the wireless device and the network node indicating that the wireless channel satisfies a LOS path criterion. The communications manager 520 may be configured as or otherwise support a means for communicating a message with the network node in accordance with the LOS mode parameter.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for exchanging signaling supporting LOS MIMO communications, for example, configuring a UE with one or more LOS mode parameters resulting in reduced processing, reduced power consumption, and more efficient utilization of communication resources.

Figure 6:
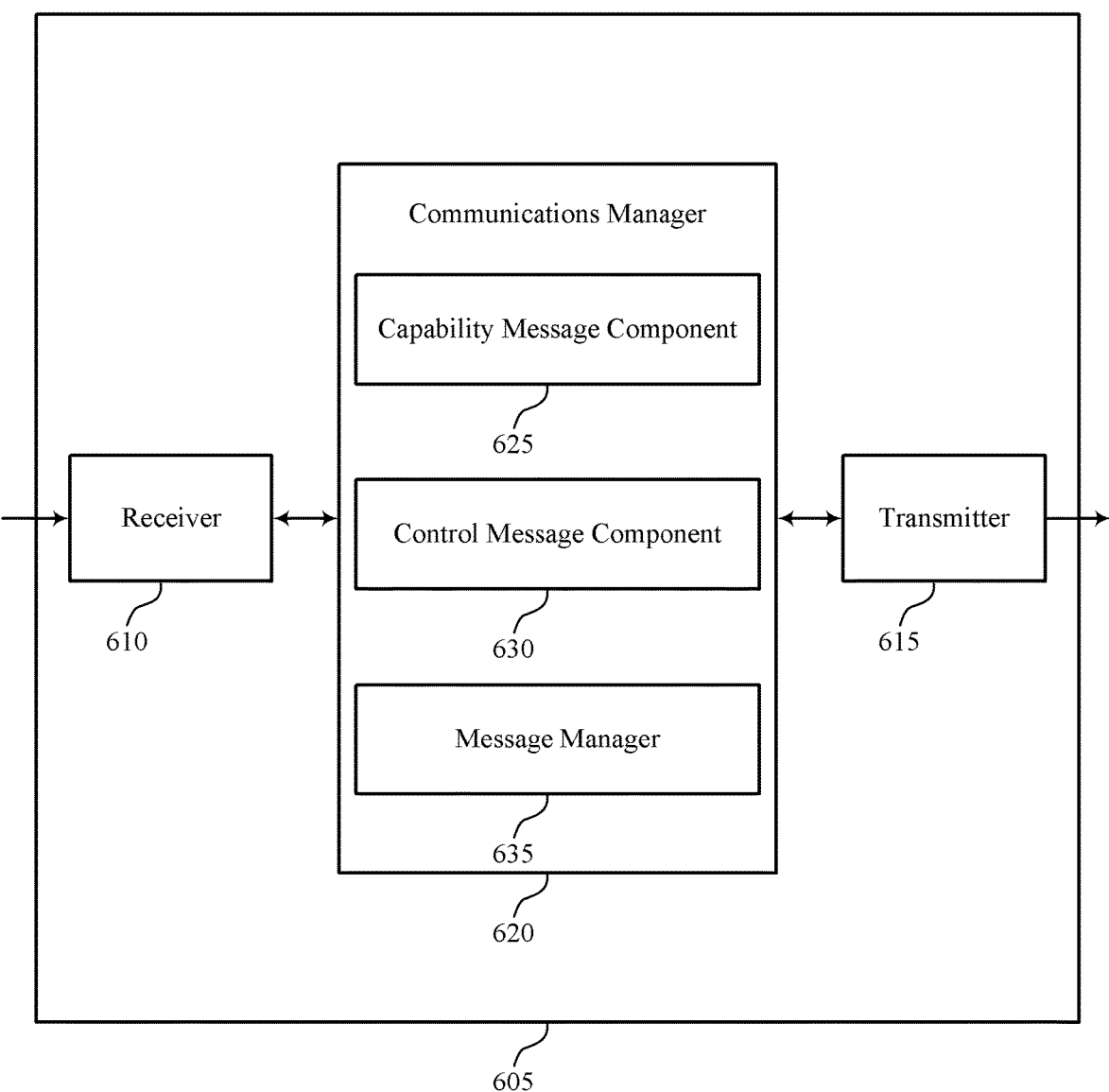

FIG. 6 shows a block diagram 600 of a device 605 that supports LOS MIMO signaling aspects in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to LOS MIMO signaling aspects). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to LOS MIMO signaling aspects). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of LOS MIMO signaling aspects as described herein. For example, the communications manager 620 may include a capability message component 625, a control message component 630, a message manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a wireless device in accordance with examples as disclosed herein. The capability message component 625 may be configured as or otherwise support a means for transmitting, to a network node, a capability message indicating that the wireless device supports a LOS mode. The control message component 630 may be configured as or otherwise support a means for receiving, from the network node in response to the capability message, a control message indicating activation of the LOS mode and at least one LOS mode parameter based at least in part a channel measurement associated with a wireless channel between the wireless device and the network node indicating that the wireless channel satisfies a LOS path criterion. The message manager 635 may be configured as or otherwise support a means for communicating a message with the network node in accordance with the LOS mode parameter.

Figure 7:
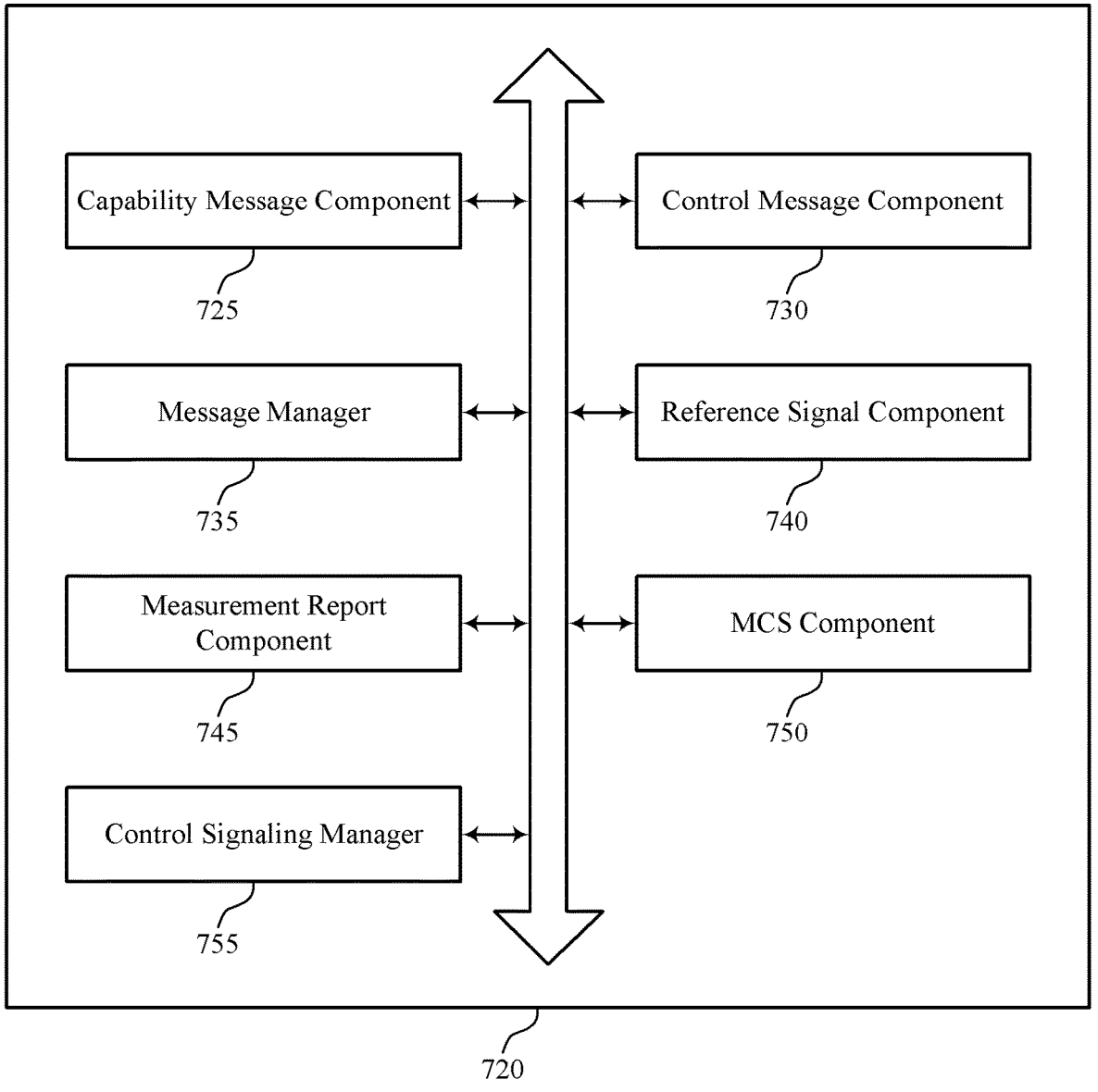
FIG. 7 shows a block diagram of a communications manager that supports LOS MIMO signaling aspects in accordance with aspects of the present disclosure.

FIG. 7 shows a block diagram 700 of a communications manager 720 that supports LOS MIMO signaling aspects in accordance with aspects of the present disclosure. The communications manager 720 may be an example of aspects of a communications manager 520, a communications manager 620, or both, as described herein. The communications manager 720, or various components thereof, may be an example of means for performing various aspects of LOS MIMO signaling aspects as described herein. For example, the communications manager 720 may include a capability message component 725, a control message component 730, a message manager 735, a reference signal component 740, a measurement report component 745, an MCS component 750, a control signaling manager 755, or any combination thereof. Each of these components may communicate, directly or indirectly, with one another (e.g., via one or more buses).

The communications manager 720 may support wireless communication at a wireless device in accordance with examples as disclosed herein. The capability message component 725 may be configured as or otherwise support a means for transmitting, to a network node, a capability message indicating that the wireless device supports a LOS mode. The control message component 730 may be configured as or otherwise support a means for receiving, from the network node in response to the capability message, a control message indicating activation of the LOS mode and at least one LOS mode parameter based at least in part on a channel measurement associated with a wireless channel between the wireless device and the network node indicating that the wireless channel satisfies a LOS path criterion. The message manager 735 may be configured as or otherwise support a means for communicating a message with the network node in accordance with the LOS mode parameter.

In some examples, the reference signal component 740 may be configured as or otherwise support a means for receiving a reference signal from the network node for performing the channel measurement associated with the wireless channel between the wireless device and the network node, where the reference signal includes one of a CSI-RS or a dedicated downlink reference signal for the LOS mode.

In some examples, the measurement report component 745 may be configured as or otherwise support a means for transmitting a measurement report to the network node, the measurement report indicating the channel measurement based on receiving the reference signal.

In some examples, to support transmitting the measurement report, the measurement report component 745 may be configured as or otherwise support a means for transmitting a CSI report indicating the channel measurement.

In some examples, one or more bit fields of the CSI report include a CQI, a PMI, an RI, or any combination thereof, the one or more bit fields indicating the channel measurement.

In some examples, to support transmitting the CSI report, the measurement report component 745 may be configured as or otherwise support a means for transmitting the CSI report based on receiving a trigger included in a MAC-CE or DCI.

In some examples, to support transmitting the measurement report, the measurement report component 745 may be configured as or otherwise support a means for transmitting a MAC-CE indicating the channel measurement based on an expiration of a timer or the channel measurement satisfying a threshold.

In some examples, the reference signal component 740 may be configured as or otherwise support a means for transmitting a reference signal to the network node for the network node to perform the channel measurement associated with the wireless channel between the wireless device and the network node, where the reference signal includes one of a sounding reference signal or a dedicated uplink reference signal for the LOS mode.

In some examples, the reference signal component 740 may be configured as or otherwise support a means for receiving a request for the reference signal, where transmitting the reference signal is based on receiving the request.

In some examples, the measurement report component 745 may be configured as or otherwise support a means for receiving a measurement report from the network node, the measurement report indicating the channel measurement.

In some examples, to support receiving the measurement report, the measurement report component 745 may be configured as or otherwise support a means for receiving a MAC-CE indicating the channel measurement based on an expiration of a timer or the channel measurement satisfying a threshold.

In some examples, to support receiving the measurement report, the measurement report component 745 may be configured as or otherwise support a means for receiving DCI indicating the channel measurement.

In some examples, the control message component 730 may be configured as or otherwise support a means for receiving the control message, where the at least one LOS mode parameter includes a bit indicating a comb pattern that has a comb size greater than two for a DMRS based on the activation of the LOS mode, where the communicating the message is in accordance with the comb pattern for the DMRS.

In some examples, the control message component 730 may be configured as or otherwise support a means for receiving the control message, where the at least one LOS mode parameter includes a bit field indicating an index to a table that identifies a comb pattern that has a comb size greater than two for a DMRS based on the activation of the LOS mode, where the communicating the message is in accordance with the comb pattern for the DMRS.

In some examples, the control message component 730 may be configured as or otherwise support a means for receiving the control message, where the at least one LOS mode parameter indicates a number of layers and a set of MCS indices, where each MCS index of the set of MSC indices corresponds to at least one layer of the number of layers. In some examples, the reference signal component 740 may be configured as or otherwise support a means for transmitting the DMRS via the subset of DMRS ports and the message.

In some examples, the control message includes an antenna port field corresponding to a subset of DMRS ports on which to transmit a DMRS and a field indicating a number of layers, a rank, or both, where the number of layers, the rank, or both is less than, equal to, or greater than a quantity of DMRS ports in the subset of DMRS ports and corresponds to a number of layers for the message that includes a data transmission In some examples, the MCS component 750 may be configured as or otherwise support a means for determining a number of layers, a rank, or both, corresponding to the message that includes a data transmission based on the set of MCS indices indicated in the control message.

In some examples, the control message may include the set of MCS indices corresponding to the number of layers. In some examples, the control message may include an index indicating the set of MCS indices corresponding to the number of layers.

In some examples, the control signaling manager 755 may be configured as or otherwise support a means for receiving control signaling from the network node, the control signaling indicating a precoding codebook including a set of multiple precoding vectors, where the at least one LOS mode parameter indicates a precoding vector of the set of multiple precoding vectors and where the message is precoded for transmission using the precoding vector.

In some examples, the control message is a DCI message including a field indicating the precoding vector. In some examples, the field indicating the precoding vector is a transmit precoding matrix index field. In some examples, the control message is a MAC-CE including a field indicating the precoding vector. In some examples, the capability message indicates that the wireless device is a relay as well as one or more relay capabilities.

In some examples, the one or more relay capabilities include a physical alignment capability, a penetration loss capability, a mobility capability, or any combination thereof. In some examples, the channel measurement is a k-factor estimation.

In some examples, the capability message indicates a number of antenna panels, an antenna panel configuration, one or more sounding capabilities, one or more alignment capabilities, support of a LOS multiple input multiple output reference signal, a misalignment compensation capability, reporting capabilities, a mobility capability, or any combination thereof.

In some examples, to support receiving the control message, the control message component 730 may be configured as or otherwise support a means for receiving the control message including a bit indicating activation of the LOS mode.

Figure 8:
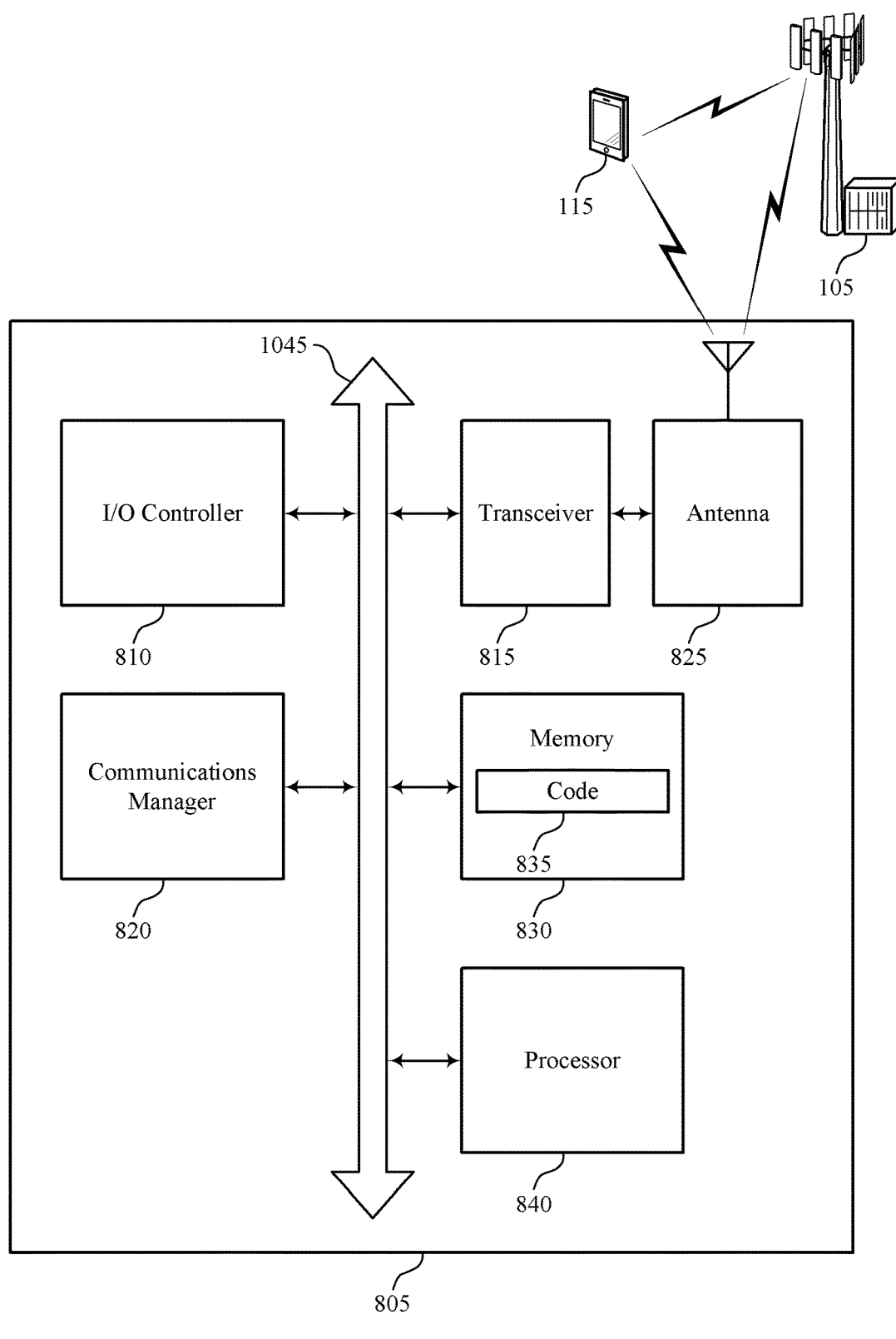
FIG. 8 shows a diagram of a system including a device that supports LOS MIMO signaling aspects in accordance with aspects of the present disclosure.

FIG. 8 shows a diagram of a system 800 including a device 805 that supports LOS MIMO signaling aspects in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825.

The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting LOS MIMO signaling aspects). For example, the device 805 or a component of the device 805 may include a processor 840 and memory 830 coupled with or to the processor 840, the processor 840 and memory 830 configured to perform various functions described herein.

The communications manager 820 may support wireless communication at a wireless device in accordance with examples as disclosed herein. For example, the communications manager 820 may be configured as or otherwise support a means for transmitting, to a network node, a capability message indicating that the wireless device supports a LOS mode. The communications manager 820 may be configured as or otherwise support a means for receiving, from the network node in response to the capability message, a control message indicating activation of the LOS mode and at least one LOS mode parameter based at least in part on a channel measurement associated with a wireless channel between the wireless device and the network node indicating that the wireless channel satisfies a LOS path criterion. The communications manager 820 may be configured as or otherwise support a means for communicating a message with the network node in accordance with the LOS mode parameter.

By including or configuring the communications manager 820 in accordance with examples as described herein, the device 805 may support techniques for exchanging signaling supporting LOS MIMO communications, for example, configuring a UE with one or more LOS mode parameters resulting in improved communication reliability, more efficient utilization of communication resources, improved coordination between devices, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of LOS MIMO signaling aspects as described herein, or the processor 840 and the memory 830 may be otherwise configured to perform or support such operations.

Figure 9:
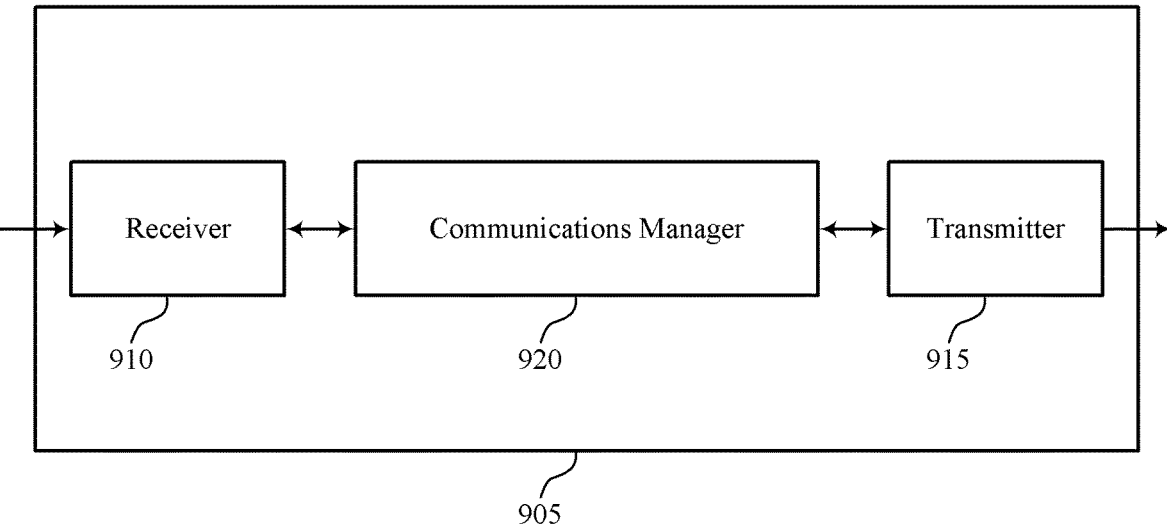
FIGS. 9 and 10 show block diagrams of devices that support LOS MIMO signaling aspects in accordance with aspects of the present disclosure.

FIG. 9 shows a block diagram 900 of a device 905 that supports LOS MIMO signaling aspects in accordance with aspects of the present disclosure. The device 905 may be an example of aspects of a base station 105 or a network node as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to LOS MIMO signaling aspects). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to LOS MIMO signaling aspects). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of LOS MIMO signaling aspects as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a network node in accordance with examples as disclosed herein. For example, the communications manager 920 may be configured as or otherwise support a means for receiving, from a wireless device, a capability message indicating that the wireless device supports a LOS mode. The communications manager 920 may be configured as or otherwise support a means for transmitting, to the wireless device in response to the capability message, a control message indicating activation of the LOS mode and at least one LOS mode parameter based on a channel measurement associated with a wireless channel between the wireless device and the network node indicating that the wireless channel satisfies a LOS path criterion. The communications manager 920 may be configured as or otherwise support a means for communicating a message with the wireless device in accordance with the LOS mode parameter.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for exchanging signaling supporting LOS MIMO communications, for example, configuring a UE with one or more LOS mode parameters resulting in reduced processing, reduced power consumption, more efficient utilization of communication resources.

Figure 10:
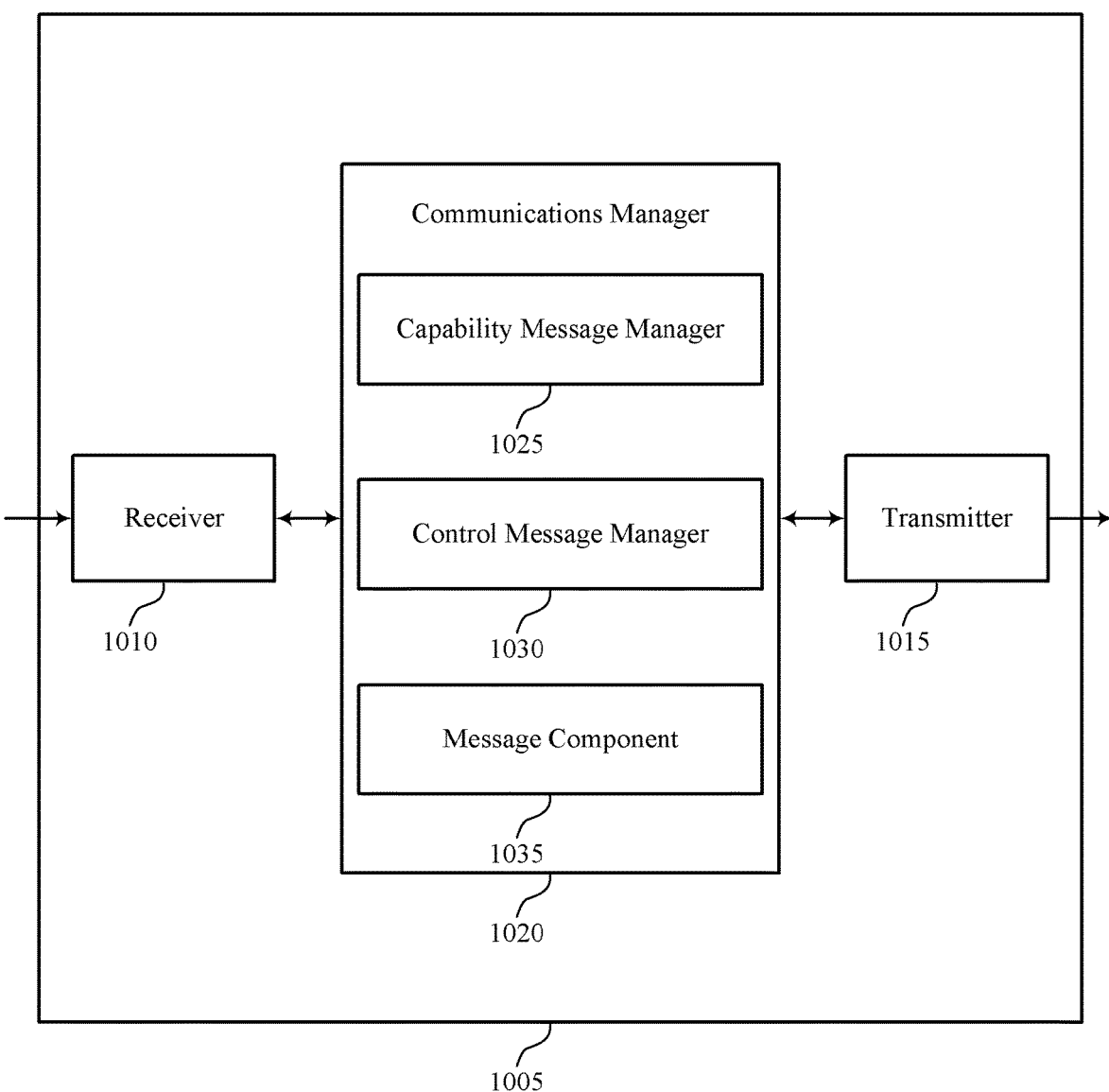

FIG. 10 shows a block diagram 1000 of a device 1005 that supports LOS MIMO signaling aspects in accordance with aspects of the present disclosure. The device 1005 may be an example of aspects of a device 905, a base station 105, or a network node as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to LOS MIMO signaling aspects). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to LOS MIMO signaling aspects). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of LOS MIMO signaling aspects as described herein. For example, the communications manager 1020 may include a capability message manager 1025, a control message manager 1030, a message component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a network node in accordance with examples as disclosed herein. The capability message manager 1025 may be configured as or otherwise support a means for receiving, from a wireless device, a capability message indicating that the wireless device supports a LOS mode. The control message manager 1030 may be configured as or otherwise support a means for transmitting, to the wireless device in response to the capability message, a control message indicating activation of the LOS mode and at least one LOS mode parameter based on a channel measurement associated with a wireless channel between the wireless device and the network node indicating that the wireless channel satisfies a LOS path criterion. The message component 1035 may be configured as or otherwise support a means for communicating a message with the wireless device in accordance with the LOS mode parameter.

Figure 11:
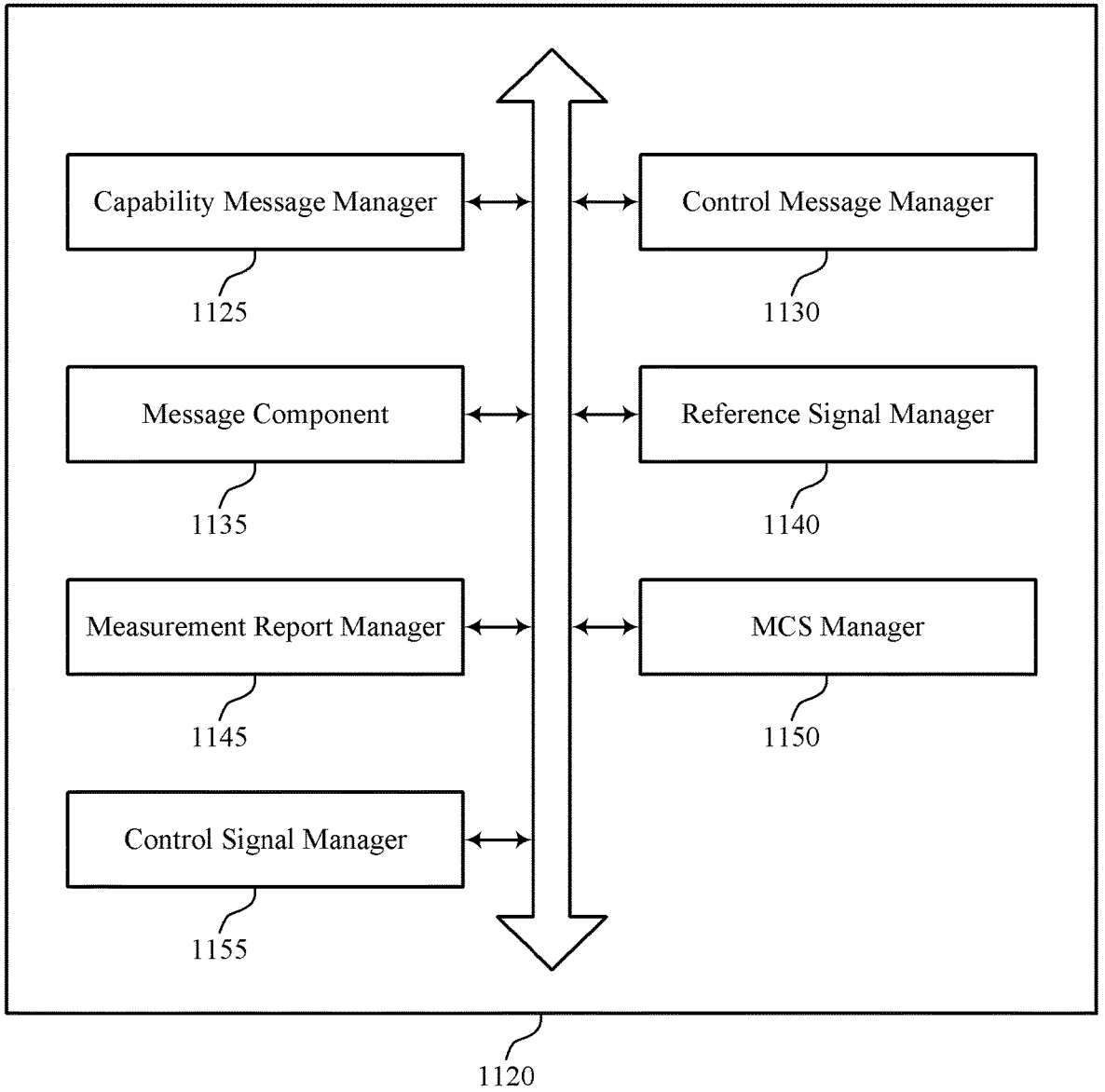
FIG. 11 shows a block diagram of a communications manager that supports LOS MIMO signaling aspects in accordance with aspects of the present disclosure.

FIG. 11 shows a block diagram 1100 of a communications manager 1120 that supports LOS MIMO signaling aspects in accordance with aspects of the present disclosure. The communications manager 1120 may be an example of aspects of a communications manager 920, a communications manager 1020, or both, as described herein. The communications manager 1120, or various components thereof, may be an example of means for performing various aspects of LOS MIMO signaling aspects as described herein. For example, the communications manager 1120 may include a capability message manager 1125, a control message manager 1130, a message component 1135, a reference signal manager 1140, a measurement report manager 1145, an MCS manager 1150, a control signal manager 1155, or any combination thereof. Each of these components may communicate, directly or indirectly, with one another (e.g., via one or more buses).

The communications manager 1120 may support wireless communication at a network node in accordance with examples as disclosed herein. The capability message manager 1125 may be configured as or otherwise support a means for receiving, from a wireless device, a capability message indicating that the wireless device supports a LOS mode. The control message manager 1130 may be configured as or otherwise support a means for transmitting, to the wireless device in response to the capability message, a control message indicating activation of the LOS mode and at least one LOS mode parameter based on a channel measurement associated with a wireless channel between the wireless device and the network node indicating that the wireless channel satisfies a LOS path criterion. The message component 1135 may be configured as or otherwise support a means for communicating a message with the wireless device in accordance with the LOS mode parameter.

In some examples, the reference signal manager 1140 may be configured as or otherwise support a means for transmitting a reference signal to the wireless device for performing the channel measurement associated with the wireless channel between the wireless device and the network node, where the reference signal includes one of a CSI-RS or a dedicated downlink reference signal for the LOS mode.

In some examples, the measurement report manager 1145 may be configured as or otherwise support a means for receiving a measurement report from the wireless device, the measurement report indicating the channel measurement based on transmitting the reference signal.

In some examples, to support receiving the measurement report, the measurement report manager 1145 may be configured as or otherwise support a means for receiving a CSI report indicating the channel measurement.

In some examples, one or more bit fields of the CSI report include a CQI, a PMI, an RI, or any combination thereof, the one or more bit fields indicating the channel measurement.

In some examples, to support receiving the measurement report, the measurement report manager 1145 may be configured as or otherwise support a means for receiving the CSI report based on transmitting a trigger included in a MAC-CE or DCI.

In some examples, to support receiving the measurement report, the measurement report manager 1145 may be configured as or otherwise support a means for receiving a MAC-CE indicating the channel measurement based on an expiration of a timer or the channel measurement satisfying a threshold.

In some examples, the reference signal manager 1140 may be configured as or otherwise support a means for receiving a reference signal from the wireless device for the network node to perform the channel measurement associated with the wireless channel between the wireless device and the network node, where the reference signal includes one of a sounding reference signal or a dedicated uplink reference signal for the LOS mode.

In some examples, the reference signal manager 1140 may be configured as or otherwise support a means for transmitting a request for the reference signal, where receiving the reference signal is based on transmitting the request.

In some examples, the measurement report manager 1145 may be configured as or otherwise support a means for transmitting a measurement report to the wireless device, the measurement report indicating the channel measurement.

In some examples, to support transmitting the measurement report, the measurement report manager 1145 may be configured as or otherwise support a means for transmitting a MAC-CE indicating the channel measurement based on an expiration of a timer or the channel measurement satisfying a threshold.

In some examples, to support transmitting the measurement report, the measurement report manager 1145 may be configured as or otherwise support a means for transmitting DCI indicating the channel measurement.

In some examples, the control message manager 1130 may be configured as or otherwise support a means for transmitting the control message, where the at least one LOS mode parameter includes a bit indicating a comb pattern that has a comb size greater than two for a DMRS based on the activation of the LOS mode, where receiving the message is in accordance with the comb pattern for the DMRS.

In some examples, the control message manager 1130 may be configured as or otherwise support a means for transmitting the control message, where the at least one LOS mode parameter includes a bit field indicating an index to a table that identifies a comb pattern that has a comb size greater than two for a DMRS based on the activation of the LOS mode, where receiving the message is in accordance with the comb pattern for the DMRS.

In some examples, the control message manager 1130 may be configured as or otherwise support a means for transmitting the control message, where the at least one LOS mode parameter indicates a number of layers and a set of MCS indices, where each MCS index of the set of MSC indices corresponds to at least one layer of the number of layers. In some examples, the reference signal manager 1140 may be configured as or otherwise support a means for receiving the DMRS via the subset of DMRS ports and the message.

In some examples, the control message includes an antenna port field corresponding to a subset of DMRS ports on which to transmit a DMRS and a field indicating a number of layers, a rank, or both, where the number of layers, the rank, or both is less than, equal to, or greater than a quantity of DMRS ports in the subset of DMRS ports and corresponds to a number of layers for the message that includes a data transmission.

In some examples, the control signal manager 1155 may be configured as or otherwise support a means for transmitting control signaling from the network node, the control signaling indicating a precoding codebook including a set of multiple precoding vectors, where the at least one LOS mode parameter indicates a precoding vector of the set of multiple precoding vectors and where the message is precoded using the precoding vector.

In some examples, the control message is a DCI message including a field indicating the precoding vector. In some examples, the field indicating the precoding vector is a transmit precoding matrix index field. In some examples, the control message is a MAC-CE including a field indicating the precoding vector. In some examples, the capability message indicates that the wireless device is a relay as well as one or more relay capabilities.

In some examples, the one or more relay capabilities include a physical alignment capability, a penetration loss capability, a mobility capability, or any combination thereof. In some examples, the channel measurement is a k-factor estimation.

In some examples, the capability message indicates a number of antenna panels, an antenna panel configuration, one or more sounding capabilities, one or more alignment capabilities, support of a LOS multiple input multiple output reference signal, a misalignment compensation capability, reporting capabilities, a mobility capability, or any combination thereof.

In some examples, to support transmitting the control message, the control message manager 1130 may be configured as or otherwise support a means for transmitting the control message including a bit indicating activation of the LOS mode.

Figure 12:
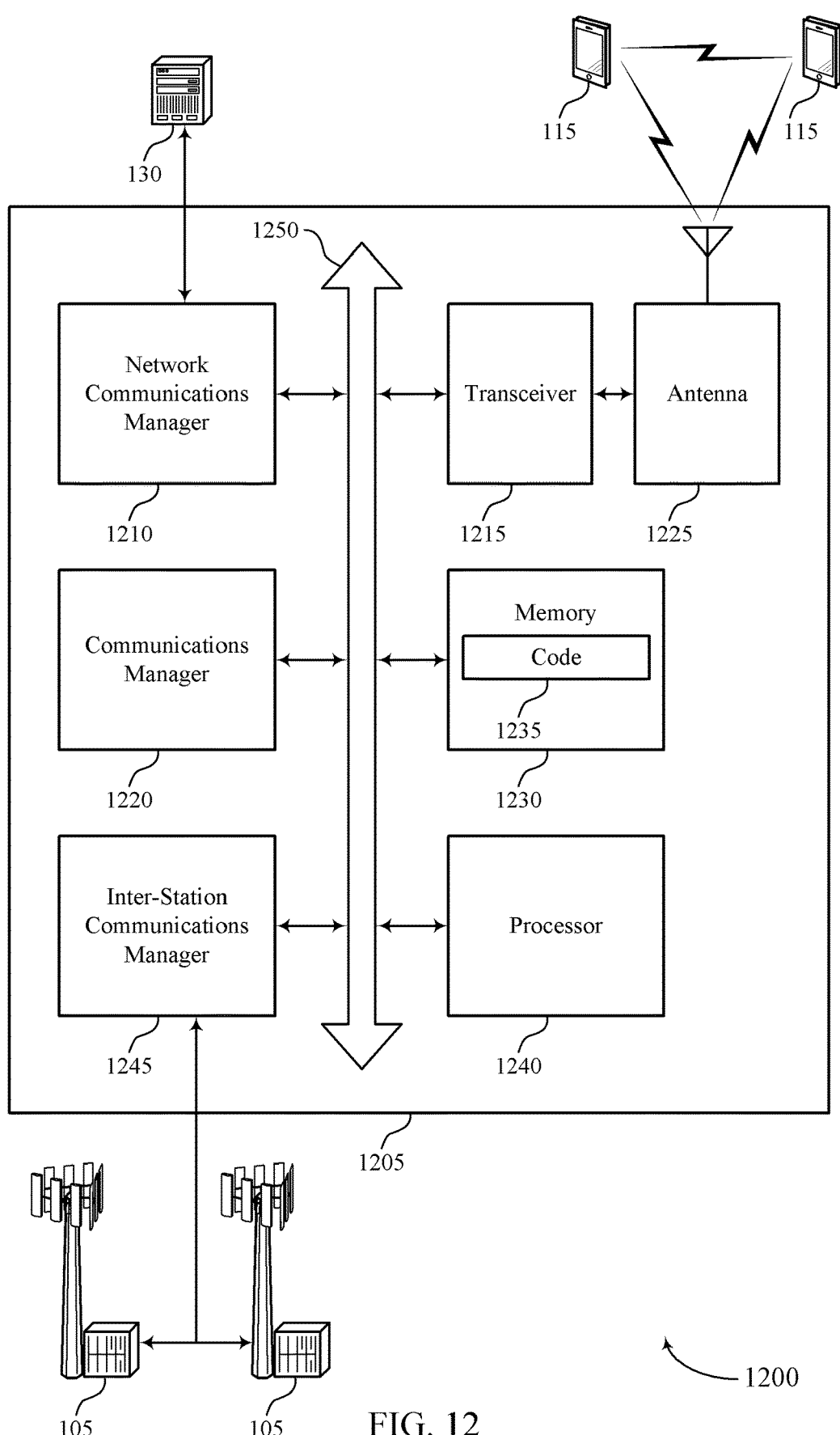
FIG. 12 shows a diagram of a system including a device that supports LOS MIMO signaling aspects in accordance with aspects of the present disclosure.

FIG. 12 shows a diagram of a system 1200 including a device 1205 that supports LOS MIMO signaling aspects in accordance with aspects of the present disclosure. The device 1205 may be an example of or include the components of a device 905, a device 1005, a base station 105, or a network node as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting LOS MIMO signaling aspects). For example, the device 1205 or a component of the device 1205 may include a processor 1240 and memory 1230 coupled with or to the processor 1240, the processor 1240 and memory 1230 configured to perform various functions described herein.

The inter-station communications manager 1245 may manage communications with other base stations 105 or network nodes, and may include a controller or scheduler for controlling communications with UEs 115 in cooperation with other base stations 105 or network nodes. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105 or network nodes.

The communications manager 1220 may support wireless communication at a network node in accordance with examples as disclosed herein. For example, the communications manager 1220 may be configured as or otherwise support a means for receiving, from a wireless device, a capability message indicating that the wireless device supports a LOS mode. The communications manager 1220 may be configured as or otherwise support a means for transmitting, to the wireless device in response to the capability message, a control message indicating activation of the LOS mode and at least one LOS mode parameter based on a channel measurement associated with a wireless channel between the wireless device and the network node indicating that the wireless channel satisfies a LOS path criterion. The communications manager 1220 may be configured as or otherwise support a means for communicating a message with the wireless device in accordance with the LOS mode parameter.

By including or configuring the communications manager 1220 in accordance with examples as described herein, the device 1205 may support techniques for exchanging signaling supporting LOS MIMO communications, for example, configuring a UE with one or more LOS mode parameters resulting in improved communication reliability, more efficient utilization of communication resources, improved coordination between devices, improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of LOS MIMO signaling aspects as described herein, or the processor 1240 and the memory 1230 may be otherwise configured to perform or support such operations.

FIG. 13 shows a flowchart illustrating a method 1300 that supports LOS MIMO signaling aspects in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a network node, a capability message indicating that the wireless device supports a LOS mode. The operations of 1305 may be performed in accordance with examples as disclosed herein. In some examples, aspects of the operations of 1305 may be performed by a capability message component 725 as described with reference to FIG. 7.

At 1310, the method may include receiving, from the network node in response to the capability message, a control message indicating activation of the LOS mode and at least one LOS mode parameter based at least in part on a channel measurement associated with a wireless channel between the wireless device and the network node indicating that the wireless channel satisfies a LOS path criterion. The operations of 1310 may be performed in accordance with examples as disclosed herein. In some examples, aspects of the operations of 1310 may be performed by a control message component 730 as described with reference to FIG. 7.

At 1315, the method may include communicating a message with the network node in accordance with the LOS mode parameter. The operations of 1315 may be performed in accordance with examples as disclosed herein. In some examples, aspects of the operations of 1315 may be performed by a message manager 735 as described with reference to FIG. 7.

FIG. 14 shows a flowchart illustrating a method 1400 that supports LOS MIMO signaling aspects in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to a network node, a capability message indicating that the wireless device supports a LOS mode. The operations of 1405 may be performed in accordance with examples as disclosed herein. In some examples, aspects of the operations of 1405 may be performed by a capability message component 725 as described with reference to FIG. 7.

At 1410, the method may include receiving a reference signal from the network node for performing the channel measurement associated with the wireless channel between the wireless device and the network node, where the reference signal includes one of a CSI-RS or a dedicated downlink reference signal for the LOS mode. The operations of 1410 may be performed in accordance with examples as disclosed herein. In some examples, aspects of the operations of 1410 may be performed by a reference signal component 740 as described with reference to FIG. 7.

At 1415, the method may include receiving, from the network node in response to the capability message, a control message indicating activation of the LOS mode and at least one LOS mode parameter based at least in part on a channel measurement associated with a wireless channel between the wireless device and the network node indicating that the wireless channel satisfies a LOS path criterion. The operations of 1415 may be performed in accordance with examples as disclosed herein. In some examples, aspects of the operations of 1415 may be performed by a control message component 730 as described with reference to FIG. 7.

At 1420, the method may include communicating a message with the network node in accordance with the LOS mode parameter. The operations of 1420 may be performed in accordance with examples as disclosed herein. In some examples, aspects of the operations of 1420 may be performed by a message manager 735 as described with reference to FIG. 7.

FIG. 15 shows a flowchart illustrating a method 1500 that supports LOS MIMO signaling aspects in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include transmitting, to a network node, a capability message indicating that the wireless device supports a LOS mode. The operations of 1505 may be performed in accordance with examples as disclosed herein. In some examples, aspects of the operations of 1505 may be performed by a capability message component 725 as described with reference to FIG. 7.

At 1510, the method may include transmitting a reference signal to the network node for the network node to perform the channel measurement associated with the wireless channel between the wireless device and the network node, where the reference signal includes one of a sounding reference signal or a dedicated uplink reference signal for the LOS mode. The operations of 1510 may be performed in accordance with examples as disclosed herein. In some examples, aspects of the operations of 1510 may be performed by a reference signal component 740 as described with reference to FIG. 7.

At 1515, the method may include receiving, from the network node in response to the capability message, a control message indicating activation of the LOS mode and at least one LOS mode parameter based at least in part on a channel measurement associated with a wireless channel between the wireless device and the network node indicating that the wireless channel satisfies a LOS path criterion. The operations of 1515 may be performed in accordance with examples as disclosed herein. In some examples, aspects of the operations of 1515 may be performed by a control message component 730 as described with reference to FIG. 7.

At 1520, the method may include communicating a message with the network node in accordance with the LOS mode parameter. The operations of 1520 may be performed in accordance with examples as disclosed herein. In some examples, aspects of the operations of 1520 may be performed by a message manager 735 as described with reference to FIG. 7.

FIG. 16 shows a flowchart illustrating a method 1600 that supports LOS MIMO signaling aspects in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include transmitting, to a network node, a capability message indicating that the wireless device supports a LOS mode. The operations of 1605 may be performed in accordance with examples as disclosed herein. In some examples, aspects of the operations of 1605 may be performed by a capability message component 725 as described with reference to FIG. 7.

At 1610, the method may include receiving, from the network node in response to the capability message, a control message indicating activation of the LOS mode and at least one LOS mode parameter based at least in part on a channel measurement associated with a wireless channel between the wireless device and the network node indicating that the wireless channel satisfies a LOS path criterion. The operations of 1610 may be performed in accordance with examples as disclosed herein. In some examples, aspects of the operations of 1610 may be performed by a control message component 730 as described with reference to FIG. 7.

At 1615, the method may include receiving the control message, where the at least one LOS mode parameter indicates a number of layers and a set of MCS indices, where each MCS index of the set of MCS indices corresponds to at least one layer of the number of layers. The operations of 1615 may be performed in accordance with examples as disclosed herein. In some examples, aspects of the operations of 1615 may be performed by a control message component 730 as described with reference to FIG. 7.

At 1620, the method may include communicating a message with the network node based on the control message. The operations of 1620 may be performed in accordance with examples as disclosed herein. In some examples, aspects of the operations of 1620 may be performed by a message manager 735 as described with reference to FIG. 7.

At 1625, the method may include transmitting the DMRS via the subset of DMRS ports and the message. The operations of 1625 may be performed in accordance with examples as disclosed herein. In some examples, aspects of the operations of 1625 may be performed by a reference signal component 740 as described with reference to FIG. 7.

FIG. 17 shows a flowchart illustrating a method 1700 that supports LOS MIMO signaling aspects in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include receiving control signaling from the network node, the control signaling indicating a precoding codebook including a set of multiple precoding vectors, where the at least one LOS mode parameter indicates a precoding vector of the set of multiple precoding vectors and where the message is precoded for transmission using the precoding vector. The operations of 1705 may be performed in accordance with examples as disclosed herein. In some examples, aspects of the operations of 1705 may be performed by a control signaling manager 755 as described with reference to FIG. 7.

At 1710, the method may include transmitting, to a network node, a capability message indicating that the wireless device supports a LOS mode. The operations of 1710 may be performed in accordance with examples as disclosed herein. In some examples, aspects of the operations of 1710 may be performed by a capability message component 725 as described with reference to FIG. 7.

At 1715, the method may include receiving, from the network node in response to the capability message, a control message indicating activation of the LOS mode and at least one LOS mode parameter based at least in part on a channel measurement associated with a wireless channel between the wireless device and the network node indicating that the wireless channel satisfies a LOS path criterion. The operations of 1715 may be performed in accordance with examples as disclosed herein. In some examples, aspects of the operations of 1715 may be performed by a control message component 730 as described with reference to FIG. 7.

At 1720, the method may include communicating a message with the network node in accordance with the LOS mode parameter. The operations of 1720 may be performed in accordance with examples as disclosed herein. In some examples, aspects of the operations of 1720 may be performed by a message manager 735 as described with reference to FIG. 7.

FIG. 18 shows a flowchart illustrating a method 1800 that supports LOS MIMO signaling aspects in accordance with aspects of the present disclosure. The operations of the method 1800 may be implemented by a base station or a network node or its components as described herein. For example, the operations of the method 1800 may be performed by a base station 105 or the network node as described with reference to FIGS. 1 through 4 and 9 through 12. In some examples, a base station or the network node may execute a set of instructions to control the functional elements of the base station or the network node to perform the described functions. Additionally or alternatively, the base station or the network may perform aspects of the described functions using special-purpose hardware.

At 1805, the method may include receiving, from a wireless device, a capability message indicating that the wireless device supports a LOS mode. The operations of 1805 may be performed in accordance with examples as disclosed herein. In some examples, aspects of the operations of 1805 may be performed by a capability message manager 1125 as described with reference to FIG. 11.

At 1810, the method may include transmitting, to the wireless device in response to the capability message, a control message indicating activation of the LOS mode and at least one LOS mode parameter based on a channel measurement associated with a wireless channel between the wireless device and the network node indicating that the wireless channel satisfies a LOS path criterion. The operations of 1810 may be performed in accordance with examples as disclosed herein. In some examples, aspects of the operations of 1810 may be performed by a control message manager 1130 as described with reference to FIG. 11.

At 1815, the method may include communicating a message with the wireless device in accordance with the LOS mode parameter. The operations of 1815 may be performed in accordance with examples as disclosed herein. In some examples, aspects of the operations of 1815 may be performed by a message component 1135 as described with reference to FIG. 11.

The following provides an overview of aspects of the present disclosure:

Aspect 1: A method for wireless communication at a wireless device, comprising: transmitting, to a network node, a capability message indicating that the wireless device supports a LOS mode; receiving, from the network node in response to the capability message, a control message indicating activation of the LOS mode and at least one LOS mode parameter based at least in part on a channel measurement associated with a wireless channel between the wireless device and the network node indicating that the wireless channel satisfies a LOS path criterion; and communicating a message with the network node in accordance with the LOS mode parameter.

Aspect 2: The method of aspect 1, further comprising: receiving a reference signal from the network node for performing the channel measurement associated with the wireless channel between the wireless device and the network node, wherein the reference signal comprises one of a CSI-RS or a dedicated downlink reference signal for the LOS mode.

Aspect 3: The method of aspect 2, further comprising: transmitting a measurement report to the network node, the measurement report indicating the channel measurement based at least in part on receiving the reference signal.

Aspect 4: The method of aspect 3, wherein transmitting the measurement report comprises: transmitting a CSI report indicating the channel measurement.

Aspect 5: The method of aspect 4, wherein one or more bit fields of the CSI report include a CQI, a PMI, an RI, or any combination thereof, the one or more bit fields indicating the channel measurement.

Aspect 6: The method of any of aspects 4 through 5, wherein transmitting the CSI report comprises: transmitting the CSI report based at least in part on receiving a trigger included in a MAC-CE or DCI.

Aspect 7: The method of any of aspects 3 through 6, wherein transmitting the measurement report comprises: transmitting a MAC-CE indicating the channel measurement based at least in part on an expiration of a timer or the channel measurement satisfying a threshold.

Aspect 8: The method of any of aspects 1 through 7, further comprising: transmitting a reference signal to the network node for the network node to perform the channel measurement associated with the wireless channel between the wireless device and the network node, wherein the reference signal comprises one of an SRS or a dedicated uplink reference signal for the LOS mode.

Aspect 9: The method of aspect 8, further comprising: receiving a request for the reference signal, wherein transmitting the reference signal is based at least in part on receiving the request.

Aspect 10: The method of any of aspects 1 through 9, further comprising: receiving a measurement report from the network node, the measurement report indicating the channel measurement.

Aspect 11: The method of aspect 10, wherein receiving the measurement report comprises: receiving a MAC-CE indicating the channel measurement based at least in part on an expiration of a timer or the channel measurement satisfying a threshold.

Aspect 12: The method of any of aspects 10 through 11, wherein receiving the measurement report comprises: receiving DCI indicating the channel measurement.

Aspect 13: The method of any of aspects 1 through 12, further comprising: receiving the control message, wherein the at least one LOS mode parameter comprises a bit indicating a comb pattern that has a comb size greater than two for a DMRS based at least in part on the activation of the LOS mode, wherein the communicating the message is in accordance with the comb pattern for the DMRS.

Aspect 14: The method of any of aspects 1 through 12, further comprising: receiving the control message, wherein the at least one LOS mode parameter comprises a bit field indicating an index to a table that identifies a comb pattern that has a comb size greater than two for a DMRS based at least in part on the activation of the LOS mode, wherein the communicating the message is in accordance with the comb pattern for the DMRS.

Aspect 15: The method of any of aspects 1 through 14, wherein receiving the control message, wherein the at least one LOS mode parameter indicates a number of layers and a set of MCS indices, wherein each MCS index in the set of MCS indices corresponds to at least one layer of the number of layers, and wherein the communicating the message comprises: transmitting the message based on the control message Aspect 16: The method of aspect 15, further comprising: determining a number of layers, a rank, or both, corresponding to the message that comprises a data transmission based at least in part on the set of MCS indices indicated in the control message.

Aspect 17: The method of any of aspects 15 through 16, wherein the control message comprises the set of MCS indices corresponding to the number of layers.

Aspect 18: The method of any of aspects 15 through 16, wherein the control message comprises an index indicating the set of MCS indices corresponding to the number of layers.

Aspect 19: The method of any of aspects 15 through 16, wherein the control message comprises an antenna port field corresponding to a subset of DMRS ports on which to transmit a DMRS and a field indicating a number of layers, a rank, or both, the number of layers, the rank, or both is less than, equal to, or greater than a quantity of DMRS ports in the subset of DMRS ports and corresponds to a number of layers for the message that comprises a data transmission.

Aspect 20: The method of any of aspects 1 through 19, further comprising: receiving control signaling from the network node, the control signaling indicating a precoding codebook comprising a plurality of precoding vectors, wherein the at least one LOS mode parameter indicates a precoding vector of the plurality of precoding vectors and wherein the message is precoded for transmission using the precoding vector.

Aspect 21: The method of aspect 20, wherein the control message is a DCI message comprising a field indicating the precoding vector.

Aspect 22: The method of aspect 21, wherein the field indicating the precoding vector is a transmit PMI field.

Aspect 23: The method of any of aspects 20 through 22, wherein the control message is a MAC-CE comprising a field indicating the precoding vector.

Aspect 24: The method of any of aspects 1 through 23, wherein the capability message indicates that the wireless device is a relay as well as one or more relay capabilities.

Aspect 25: The method of aspect 24, wherein the one or more relay capabilities comprise a physical alignment capability, a penetration loss capability, a mobility capability, or any combination thereof.

Aspect 26: The method of any of aspects 1 through 25, wherein the channel measurement is a k-factor estimation.

Aspect 27: The method of any of aspects 1 through 26, wherein the capability message indicates a number of antenna panels, an antenna panel configuration, one or more sounding capabilities, one or more alignment capabilities, support of a LOS multiple input multiple output reference signal, a misalignment compensation capability, reporting capabilities, a mobility capability, or any combination thereof.

Aspect 28: The method of any of aspects 1 through 27, wherein receiving the control message further comprises: receiving the control message comprising a bit indicating activation of the LOS mode.

Aspect 29: A method for wireless communication at a network node, comprising: receiving, from a wireless device, a capability message indicating that the wireless device supports a LOS mode; transmitting, to the wireless device in response to the capability message, a control message indicating activation of the LOS mode and at least one LOS mode parameter based at least in part on a channel measurement associated with a wireless channel between the wireless device and the network node indicating that the wireless channel satisfies a LOS path criterion; and communicating a message with the wireless device in accordance with the LOS mode parameter.

Aspect 30: The method of aspect 29, further comprising: transmitting a reference signal to the wireless device for performing the channel measurement associated with the wireless channel between the wireless device and the network node, wherein the reference signal comprises one of a CSI-RS or a dedicated downlink reference signal for the LOS mode.

Aspect 31: The method of aspect 30, further comprising: receiving a measurement report from the wireless device, the measurement report indicating the channel measurement based at least in part on transmitting the reference signal.

Aspect 32: The method of aspect 31, wherein receiving the measurement report comprises: receiving a CSI report indicating the channel measurement.

Aspect 33: The method of aspect 32, wherein one or more bit fields of the CSI report include a CQI, a PMI, an RI, or any combination thereof, the one or more bit fields indicating the channel measurement.

Aspect 34: The method of any of aspects 32 through 33, wherein receiving the measurement report comprises: receiving the CSI report based at least in part on transmitting a trigger included in a MAC-CE or DCI.

Aspect 35: The method of any of aspects 31 through 34, wherein receiving the measurement report comprises: receiving a MAC-CE indicating the channel measurement based at least in part on an expiration of a timer or the channel measurement satisfying a threshold.

Aspect 36: The method of any of aspects 29 through 35, further comprising: receiving a reference signal from the wireless device for the network node to perform the channel measurement associated with the wireless channel between the wireless device and the network node, wherein the reference signal comprises one of an SRS or a dedicated uplink reference signal for the LOS mode.

Aspect 37: The method of aspect 36, further comprising: transmitting a request for the reference signal, wherein receiving the reference signal is based at least in part on transmitting the request.

Aspect 38: The method of any of aspects 29 through 37, further comprising: transmitting a measurement report to the wireless device, the measurement report indicating the channel measurement.

Aspect 39: The method of aspect 38, wherein transmitting the measurement report comprises: transmitting a MAC-CE indicating the channel measurement based at least in part on an expiration of a timer or the channel measurement satisfying a threshold.

Aspect 40: The method of any of aspects 38 through 39, wherein transmitting the measurement report comprises: transmitting DCI indicating the channel measurement.

Aspect 41: The method of any of aspects 29 through 40, further comprising: transmitting the control message, wherein the at least one LOS mode parameter comprises a bit indicating a comb pattern that has a comb size greater than two for a DMRS based at least in part on the activation of the LOS mode, wherein receiving the message is in accordance with the comb pattern for the DMRS.

Aspect 42: The method of any of aspects 29 through 40, further comprising: transmitting the control message, wherein the at least one LOS mode parameter comprises a bit field indicating an index to a table that identifies a comb pattern that has a comb size greater than two for a DMRS based at least in part on the activation of the LOS mode, wherein receiving the message is in accordance with the comb pattern for the DMRS.

Aspect 43: The method of any of aspects 29 through 42, wherein transmitting the control message, wherein the at least one LOS mode parameter indicates a number of layers and a set of MCS indices, wherein each MCS index in the set of MCS indices corresponds to at least one layer of the number of layers, and wherein the communicating the message comprises: receiving the message based on the control message.

Aspect 44: The method of aspect 43, wherein the control message comprises the set of MCS indices corresponding to the number of layers.

Aspect 45: The method of any of aspects 43, wherein the control message comprises an index indicating the set of MCS indices corresponding to the number of layers.

Aspect 46: The method of any of aspects 29 through 45, wherein the control message comprises an antenna port field corresponding to a subset of DMRS ports on which to transmit a DMRS and a field indicating a number of layers, a rank, or both, the number of layers, the rank, or both is less than, equal to, or greater than a quantity of DMRS ports in the subset of DMRS ports and corresponds to a number of layers for the message that comprises a data transmission.

Aspect 47: The method of any of aspects 29 through 46, further comprising: transmitting control signaling from the network node, the control signaling indicating a precoding codebook comprising a plurality of precoding vectors, wherein the at least one LOS mode parameter indicates a precoding vector of the plurality of precoding vectors and wherein the message is precoded using the precoding vector.

Aspect 48: The method of aspect 47, wherein the control message is a DCI message comprising a field indicating the precoding vector.

Aspect 49: The method of aspect 48, wherein the field indicating the precoding vector is a transmit PMI field.

Aspect 50: The method of any of aspects 47 through 49, wherein the control message is a MAC-CE comprising a field indicating the precoding vector.

Aspect 51: The method of any of aspects 29 through 50, wherein the capability message indicates that the wireless device is a relay as well as one or more relay capabilities.

Aspect 52: The method of aspect 51, wherein the one or more relay capabilities comprise a physical alignment capability, a penetration loss capability, a mobility capability, or any combination thereof.

Aspect 53: The method of any of aspects 29 through 52, wherein the channel measurement is a k-factor estimation.

Aspect 54: The method of any of aspects 29 through 53, wherein the capability message indicates a number of antenna panels, an antenna panel configuration, one or more sounding capabilities, one or more alignment capabilities, support of a LOS multiple input multiple output reference signal, a misalignment compensation capability, reporting capabilities, a mobility capability, or any combination thereof.

Aspect 55: The method of any of aspects 29 through 54, wherein transmitting the control message further comprises: transmitting the control message comprising a bit indicating activation of the LOS mode.

Aspect 56: An apparatus for wireless communication at a wireless device, comprising a processor; memory coupled with the processor; and instructions stored in the memory and executable by the processor to cause the apparatus to perform a method of any of aspects 1 through 28.

Aspect 57: An apparatus for wireless communication at a wireless device, comprising at least one means for performing a method of any of aspects 1 through 28.

Aspect 58: A non-transitory computer-readable medium storing code for wireless communication at a wireless device, the code comprising instructions executable by a processor to perform a method of any of aspects 1 through 28.

Aspect 59: An apparatus for wireless communication at a network node, comprising a processor; memory coupled with the processor; and instructions stored in the memory and executable by the processor to cause the apparatus to perform a method of any of aspects 29 through 55.

Aspect 60: An apparatus for wireless communication at a network node, comprising at least one means for performing a method of any of aspects 29 through 55.

Aspect 61: A non-transitory computer-readable medium storing code for wireless communication at a network node, the code comprising instructions executable by a processor to perform a method of any of aspects 29 through 55.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a wireless device, comprising:
   transmitting, to a network node, a capability message indicating that the wireless device supports a line of sight mode;
   receiving, from the network node in response to the capability message, a control message indicating activation of the line of sight mode and at least one line of sight mode parameter based at least in part on a channel measurement associated with a wireless channel between the wireless device and the network node indicating that the wireless channel satisfies a line of sight path criterion; and
   communicating a message with the network node in accordance with the at least one line of sight mode parameter.

2. The method of claim 1, further comprising:
   receiving a reference signal from the network node for performing the channel measurement associated with the wireless channel between the wireless device and the network node, wherein the reference signal comprises one of a channel state information reference signal or a dedicated downlink reference signal for the line of sight mode.

3. The method of claim 2, further comprising:

transmitting a measurement report to the network node, the measurement report indicating the channel measurement based at least in part on receiving the reference signal.

4. The method of claim 3, wherein transmitting the measurement report comprises:

transmitting a channel state information report indicating the channel measurement.

5. The method of claim 4, wherein one or more bit fields of the channel state information report include a channel quality indicator, a precoding matrix indicator, a rank indicator, or any combination thereof, the one or more bit fields indicating the channel measurement.

6. The method of claim 4, wherein transmitting the channel state information report comprises:

transmitting the channel state information report based at least in part on receiving a trigger included in a medium access control (MAC) control element or downlink control information.

7. The method of claim 3, wherein transmitting the measurement report comprises:

transmitting a medium access control (MAC) control element indicating the channel measurement based at least in part on an expiration of a timer or the channel measurement satisfying a threshold.

8. The method of claim 1, further comprising:

transmitting a reference signal to the network node for the network node to perform the channel measurement associated with the wireless channel between the wireless device and the network node, wherein the reference signal comprises one of a sounding reference signal or a dedicated uplink reference signal for the line of sight mode.

9. The method of claim 8, further comprising:

receiving a request for the reference signal, wherein transmitting the reference signal is based at least in part on receiving the request.

10. The method of claim 1, further comprising:

receiving a measurement report from the network node, the measurement report indicating the channel measurement.

11. The method of claim 10, wherein receiving the measurement report comprises:

receiving a medium access control (MAC) control element indicating the channel measurement based at least in part on an expiration of a timer or the channel measurement satisfying a threshold.

12. The method of claim 10, wherein receiving the measurement report comprises:

receiving downlink control information indicating the channel measurement.

13. The method of claim 1, further comprising:

receiving the control message, wherein the at least one line of sight mode parameter comprises a bit indicating a comb pattern that has a comb size greater than two for a demodulation reference signal based at least in part on the activation of the line of sight mode, wherein the communicating the message is in accordance with the comb pattern for the demodulation reference signal.

14. The method of claim 1, further comprising:

receiving the control message, wherein the at least one line of sight mode parameter comprises a bit field indicating an index to a table that identifies a comb pattern that has a comb size greater than two for a demodulation reference signal based at least in part on the activation of the line of sight mode, wherein the communicating the message is in accordance with the comb pattern for the demodulation reference signal.

15. The method of claim 1, further comprising:

receiving the control message, wherein the at least one line of sight mode parameter indicates a number of layers and a set of modulation and coding scheme indices, wherein each modulation and coding scheme index in the set of modulation and coding scheme indices corresponds to at least one layer of the number of layers, and wherein the communicating the message comprises:

transmitting the message based on the control message.

16. The method of claim 15, further comprising:

determining a number of layers, a rank, or both, corresponding to the message that comprises a data transmission based at least in part on the set of modulation and coding scheme indices indicated in the control message.

17. The method of claim 15, wherein the control message comprises the set of modulation and coding scheme indices corresponding to the number of layers.

18. The method of claim 15, wherein the control message comprises an index indicating the set of modulation and coding scheme indices corresponding to the number of layers.

19. The method of claim 1, wherein:

the control message comprises an antenna port field corresponding to a subset of demodulation reference signal ports on which to transmit a demodulation reference signal and a field indicating a number of layers, a rank, or both, wherein the number of layers, the rank, or both is less than, equal to, or greater than a quantity of demodulation reference signal ports in the subset of demodulation reference signal ports and corresponds to a number of layers for the message that comprises a data transmission.

20. The method of claim 1, further comprising:

receiving control signaling from the network node, the control signaling indicating a precoding codebook comprising a plurality of precoding vectors, wherein the at least one line of sight mode parameter indicates a precoding vector of the plurality of precoding vectors and wherein the message is precoded for transmission using the precoding vector.

21. The method of claim 20, wherein the control message is a downlink control information message comprising a field indicating the precoding vector.

22. The method of claim 21, wherein the field indicating the precoding vector is a transmit precoding matrix indicator field.

23. The method of claim 20, wherein the control message is a medium access control (MAC) control element comprising a field indicating the precoding vector.

24. The method of claim 1, wherein the capability message indicates that the wireless device is a relay as well as one or more relay capabilities.

25. The method of claim 24, wherein the one or more relay capabilities comprise a physical alignment capability, a penetration loss capability, a mobility capability, or any combination thereof.

26. The method of claim 1, wherein the channel measurement is a k-factor estimation.

27. The method of claim 1, wherein the capability message indicates a number of antenna panels, an antenna panel configuration, one or more sounding capabilities, one or more alignment capabilities, support of a line of sight multiple input multiple output reference signal, a misalignment compensation capability, reporting capabilities, a mobility capability, or any combination thereof.

28. A method for wireless communication at a network node, comprising:

receiving, from a wireless device, a capability message indicating that the wireless device supports a line of sight mode;

transmitting, to the wireless device in response to the capability message, a control message indicating activation of the line of sight mode and at least one line of sight mode parameter based at least in part on a channel measurement associated with a wireless channel between the wireless device and the network node indicating that the wireless channel satisfies a line of sight path criterion; and communicating a message with the wireless device in accordance with the at least one line of sight mode parameter.

29. An apparatus for wireless communication at a wireless device, comprising:

at least one processor; and memory coupled with the at least one processor and storing instructions executable by the at least one processor to cause the apparatus to:

transmit, to a network node, a capability message indicating that the wireless device supports a line of sight mode;

receive, from the network node in response to the capability message, a control message indicating activation of the line of sight mode and at least one line of sight mode parameter based at least in part on a channel measurement associated with a wireless channel between the wireless device and the network node indicating that the wireless channel satisfies a line of sight path criterion; and communicate a message with the network node in accordance with the at least one line of sight mode parameter.

30. An apparatus for wireless communication at a network node, comprising:

at least one processor; and memory coupled with the at least one processor and storing instructions executable by the at least one processor to cause the apparatus to:

receive, from a wireless device, a capability message indicating that the wireless device supports a line of sight mode;

transmit, to the wireless device in response to the capability message, a control message indicating activation of the line of sight mode and at least one line of sight mode parameter based at least in part on a channel measurement associated with a wireless channel between the wireless device and the network node indicating that the wireless channel satisfies a line of sight path criterion; and communicate a message with the wireless device in accordance with the at least one line of sight mode parameter.

* * * * *